(12) United States Patent
Hintz

(10) Patent No.: US 8,763,995 B2
(45) Date of Patent: Jul. 1, 2014

(54) HOUSING DIRECTED BUOYANT FORCE PUMP

(71) Applicant: Kenneth James Hintz, Fairfax Station, VA (US)

(72) Inventor: Kenneth James Hintz, Fairfax Station, VA (US)

( * ) Notice: Subject to any disclaimer, the term of this patent is extended or adjusted under 35 U.S.C. 154(b) by 0 days.

(21) Appl. No.: 13/910,219

(22) Filed: Jun. 5, 2013

(65) Prior Publication Data
US 2013/0266456 A1    Oct. 10, 2013

Related U.S. Application Data

(63) Continuation of application No. 11/678,603, filed on Feb. 25, 2007, now abandoned.

(51) Int. Cl.
*B01F 3/04*     (2006.01)
*A01K 63/04*    (2006.01)
*B01F 11/00*    (2006.01)

(52) U.S. Cl.
CPC ........... *A01K 63/042* (2013.01); *B01F 3/04531* (2013.01); *B01F 11/0002* (2013.01); *B01F 2003/04673* (2013.01)
USPC ........................... 261/81; 261/121.1; 261/123

(58) Field of Classification Search
CPC .............. A01K 63/042; B01F 3/04106; B01F 3/04531; B01F 7/0045; B01F 11/0002; B01F 11/0088; B01F 15/000525; B01F 2003/04134; B01F 2003/04673; C02F 1/34
USPC ......................... 261/81, 121.1, 123
See application file for complete search history.

(56) References Cited

U.S. PATENT DOCUMENTS

| | | | | |
|---|---|---|---|---|
| 3,265,388 A | * | 8/1966 | Kane, Jr. | 472/67 |
| 3,664,647 A | * | 5/1972 | Snow | 261/30 |
| 3,672,790 A | | 6/1972 | White | |
| 3,773,015 A | * | 11/1973 | Cruickshank et al. | 119/254 |
| 3,788,616 A | | 1/1974 | Clough | |
| 3,806,098 A | | 4/1974 | Clough | |
| 4,035,298 A | | 7/1977 | Cloke | |
| 4,043,914 A | | 8/1977 | Horvath | |
| 4,060,574 A | | 11/1977 | Verner | |
| 4,170,898 A | | 10/1979 | Salter | |
| 4,363,212 A | * | 12/1982 | Everett | 60/496 |
| 4,416,546 A | | 11/1983 | Parkins | |
| 4,681,484 A | | 7/1987 | Egger | |
| 4,966,096 A | | 10/1990 | Adey | |
| 5,467,739 A | | 11/1995 | Boschert | |
| 5,732,657 A | | 3/1998 | Idbeis | |
| 5,738,137 A | | 4/1998 | Reinke | |
| 6,036,357 A | * | 3/2000 | Van Drie | 366/332 |
| 6,322,056 B1 | * | 11/2001 | Drie | 261/81 |
| 6,488,270 B2 | * | 12/2002 | Whiteis | 261/62 |
| 6,523,498 B1 | | 2/2003 | Shyu | |
| 6,736,375 B2 | * | 5/2004 | Whiteis | 261/64.1 |
| 6,857,392 B1 | | 2/2005 | Shyu | |
| 7,021,900 B2 | | 4/2006 | Prueitt | |
| 7,628,528 B2 | | 12/2009 | Zeikus | |
| 8,133,386 B1 | * | 3/2012 | Van Drie | 210/150 |

* cited by examiner

*Primary Examiner* — Charles Bushey

(57) ABSTRACT

A buoyant force pump and surge apparatus is disclosed. A material which is buoyant relative to a non-solid material is used to cause a movable surface to move thereby causing the non-solid material to be pumped in surges. One use of the device is to create water surges in aquariums through the use of conventional low pressure, low volume air pumps and without the need for mechanical pumps or control electronics. A second use of the device is to move non-solid material in hazardous conditions.

12 Claims, 30 Drawing Sheets

HOUSING DIRECTED BUOYANT FORCE PUMP

BACKGROUND OF THE INVENTION

It is well known that some aquatic lifeforms such as coral and algae grow better when they are subjected to an intermittent flow of water. This intermittent flow of water is known as surge and is representative of the random ebb and flow of water in the natural environment such as a coral reef or water tumbling over a rock in a stream. Another advantage of surge is the introduction of both oxygen and $CO_2$ into the water and maintenance of those levels for healthy growth of aquatic lifeforms. The former is required for respiration of many lifeforms and the second establishes an equilibrium between the atmospheric $CO_2$ and its partial pressure in the water. $CO_2$ is reactive with water in that it produces carbonic acid which establishes a chemical equilibrium with the carbonates to produce a desirable pH. A lack of sufficient air/water exchange in a marine aquarium can lead to an environmental imbalance which is detrimental to the health of lifeforms in the aquarium.

Apparatus exist for creating this surge. One apparatus (U.S. Pat. No. 4,966,096) is the rotatable asymmetric "dump bucket" which is a container usually placed above an aquarium and shaped and configured such that as it is filled with water, the center of gravity shifts from one side of the axis of rotation to a second side of the axis of rotation. When the center of gravity is displaced in this manner, it causes a sudden rotation of the dump bucket further moving the center of gravity to the unstable side and thereby causing the dump bucket to release its contents with high velocity into the aquarium. This sudden dumping of water into the aquarium causes a large, rapid movement of water in the aquarium which mimics the surge of normal ocean water movement as well as produces desirable aeration of the water.

A second apparatus for producing a surge of water in an aquarium is to have an external tank which has a siphon arrangement (U.S. Pat. No. 5,738,137) and a fill rate sufficient to cause a siphon action to start through a large diameter pipe which empties the external tank faster than the inflow can supply fluid. When the level in the tank drops below the inflow level of the siphon, the siphon action is broken and the external tank starts to fill again.

A third apparatus for producing surge is to utilize an external tank whose outlet is obstructed by a flapper (such as that which is used in a flush toilet) to which a float is attached. When the water level reaches a threshold, the buoyant forces on the flapper valve suddenly cause it to rise and release the water in the external tank. This release of water into the aquarium causes a surge.

All three of these well known methods have a significant disadvantage and that disadvantage is the method by which the water is pumped from the aquarium into the external tank. The normal method is to use an impeller pump. Impeller pumps kill all or selectively kill some types of microorganisms (plankton) which are a typical food of some aquatic lifeforms.

There are at least two means for pumping water which do not have the disadvantage of killing plankton and these are air-lift pumps (U.S. Pat. Nos. 3,672,790, 4,035,298, 6,857, 392, 4,060,574) and the Archimedes screw, however they are both inefficient at moving fluids.

Surge has also been generated (U.S. Pat. No. 5,732,657) by using compressed air to cause water to flow at a reduced rate from a submerged chamber. The electronic actuation of an air valve through a large air orifice exit port allows the pressurized air to rapidly escape, thereby allowing the displaced water to rapidly return to the submerged chamber. This rapid refilling of the chamber creates a surge. The disadvantage of this method of creating surge is that it requires a volume of air equal to the volume of water to be initially displaced in the surge. It also requires sensing circuitry and an electrically actuated valve. It has the further disadvantage of not aerating the water while performing its function and requiring high pressure compressed air.

Another method of making waves on the surface but which could be adapted for underwater generation of surges (U.S. Pat. No. 4,170,898) is the use of mechanical motor driven wave makers. This method does not aerate the water but only causes water motion and requires large mechanical forces and a great expenditure of energy.

What is needed is in an aquarium environment is an apparatus for creating surge while minimizing the required power, eliminating control circuitry, minimizing the detrimental effects on microfauna life, and increasing air and sea surface gas exchange.

What is needed in hazardous pumping environments is an apparatus for moving non-solid materials utilizing forces which do not cause the non-solid material to become unstable.

BRIEF DESCRIPTION OF THE SEVERAL VIEWS OF THE DRAWING

The accompanying drawings, which are incorporated in and form a part of the specification, illustrate embodiments of the present invention and, together with the description, serve to explain the principles of the invention.

DETAILED DESCRIPTION OF THE INVENTION

Figure 1A:
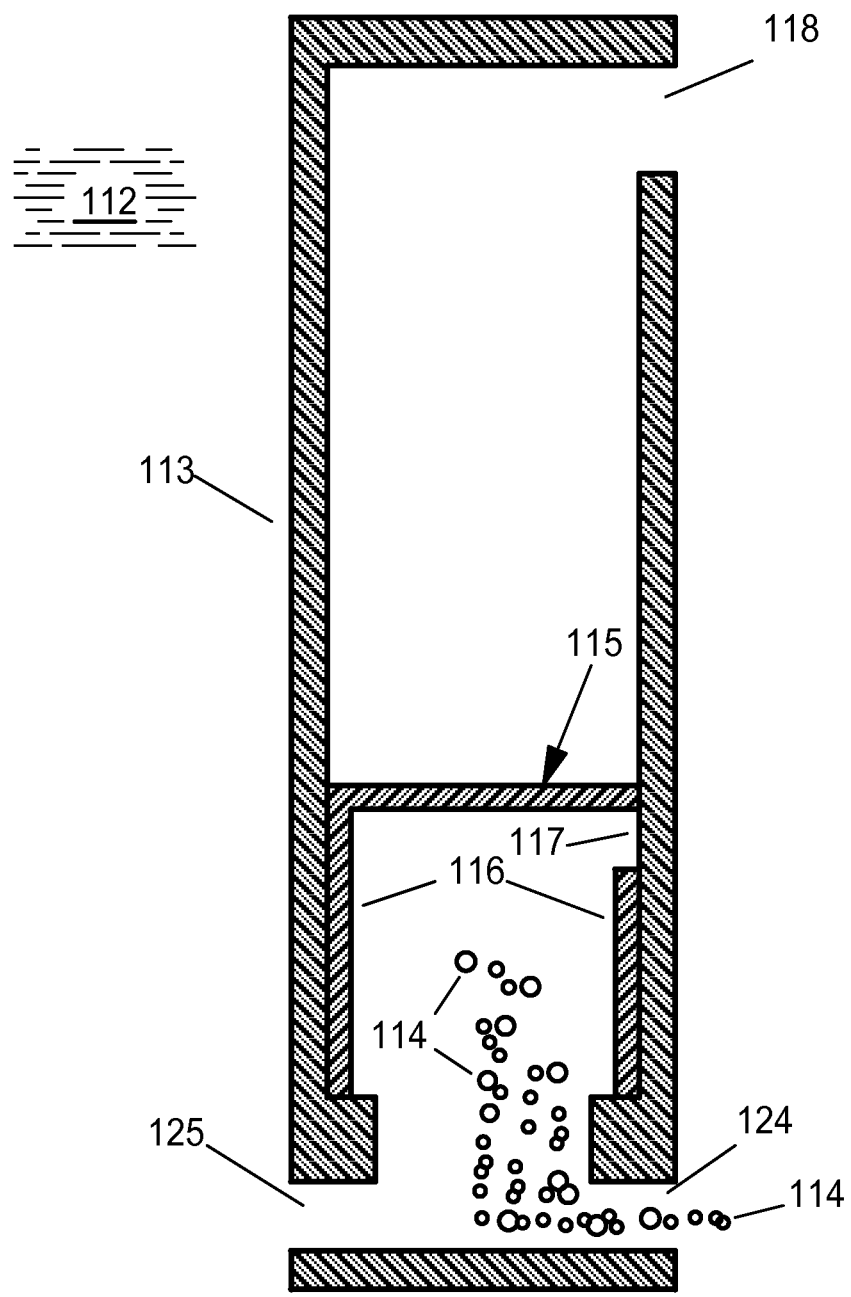
FIG. 1A through FIG. 1D are cross sectional drawings of a cylindrical or rectangular embodiment of a buoyant force pump showing the several states of its operation.

Throughout this description, the preferred embodiment and examples shown should be considered as exemplars, rather than as limitations on the present invention. The present invention is an apparatus for moving non-solid materials using a buoyant force and more specifically for moving relatively large amount of fluid to create an aerating surge while at the same time not using conventional fluid pumps which injure marine microfauna, nor electronic controllers, nor high pressure air.

The buoyant force actuated material mover and surge apparatus, hereinafter referred to as the surge pump, or pump, consists of a movable surface which is in contact with a non-solid material that one wants to move. The movable surface, and consequently the non-solid material, is caused to move when the movable surface is displaced by a force. The force which causes the movable surface to move is the result of filling a container with a material that is buoyant relative to the non-solid material. More specifically, by properly configuring the movable surface, container, and method of releasing the buoyant material subsequent to movement of the movable surface, the mass and velocity of the material being moved can be controlled and directed. The desired movement is intermittent and large, thereby resulting in a surge of non-solid material. This large intermittent movement can be urged to flow by the slow and low average power used to introduce the buoyant material into an asymmetrical container and the buoyant material can even be produced by a reactive material or a biological process such as algae respiration. A throttling mechanism or hydraulic accumulator can be used to smooth out the surges if that is desired but these methods are well known and not detailed here.

The surge apparatus can be made of a variety of materials which are resistant to degrading effects of the non-solid and buoyant materials. It is the particular geometry of the movable surface, the movable surface's center of rotation or axis of movement, and the container which causes the desired surge of non-solid material. The surge pump's functioning is not dependent on particular construction materials. Conceptually, one embodiment of the mechanism can be viewed as a special case of an inverted dump bucket with significant enhancements to cause the desired action. A second conceptual embodiment is that of a constrained container which is automatically recycled to effect repeated movement of non-solid materials. The notional material for construction is acrylic or polycarbonate sheet.

DESCRIPTION OF SEVERAL EMBODIMENTS

Throughout this description, the embodiment and examples shown should be considered as exemplars, rather than as limitations on the present invention. The embodiment which will be described here is directed towards the production of a surge of water in an aquarium. By its very nature, a surge is intermittent and of large volume, however there is no limitation to the application of this buoyant force pump to other uses and its intermittent nature can be overcome by hydraulic accumulators acting on the moving non-solid material.

A simple embodiment of a linear configuration in circular or rectangular cross section will be discussed first followed by a simple embodiment of a rotational configuration and then more complex embodiments. With reference to FIG. 1A, the surge pump is submerged in a non-solid material 112. A support structure 113 contains the movable surface 115 and the buoyant material container 116. A buoyant material 114 is introduced so that it is substantially contained by the buoyant material container 116. An opening 117 in the container 116 is substantially obstructed by the housing 113. The housing 113 has an opening 118 through which the non-solid material 112 and subsequently the buoyant material 114 exit the pump.

Figure 1B:
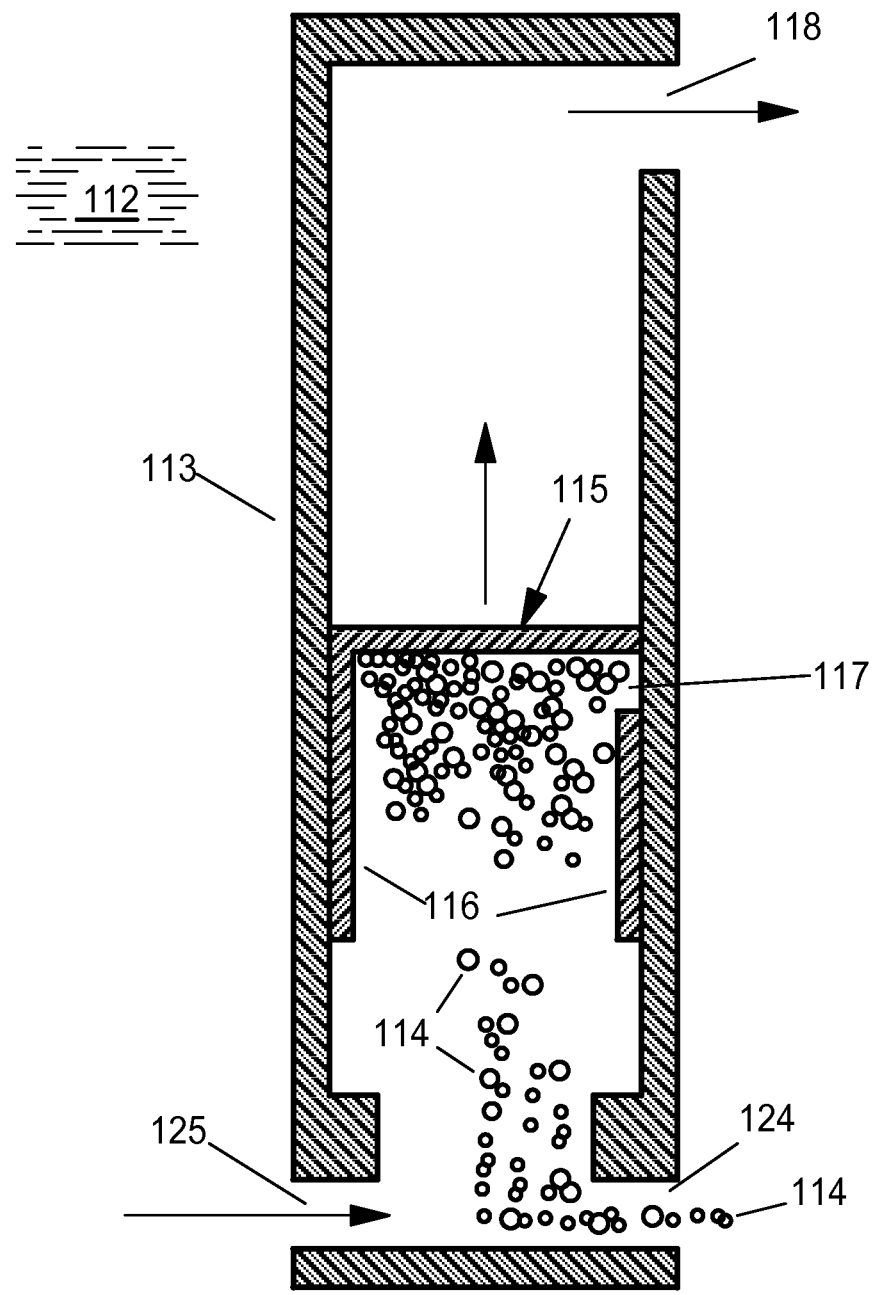

FIG. 1B shows the initial movement of the movable surface 115 in response to a sufficient amount of buoyant material 114 having been introduced into and substantially contained by the buoyant material container 116 and the housing 113. As a result of this buoyant force and the rising movable surface 115, the non-solid material 112 is forced through an opening 118 in the housing 113. Non-solid material 112 also enters the lower portion of the housing through a second opening 124 to fill the increasing volume below the buoyant material 114 in the container 116 as the container 116 moves upward.

Figure 1C:
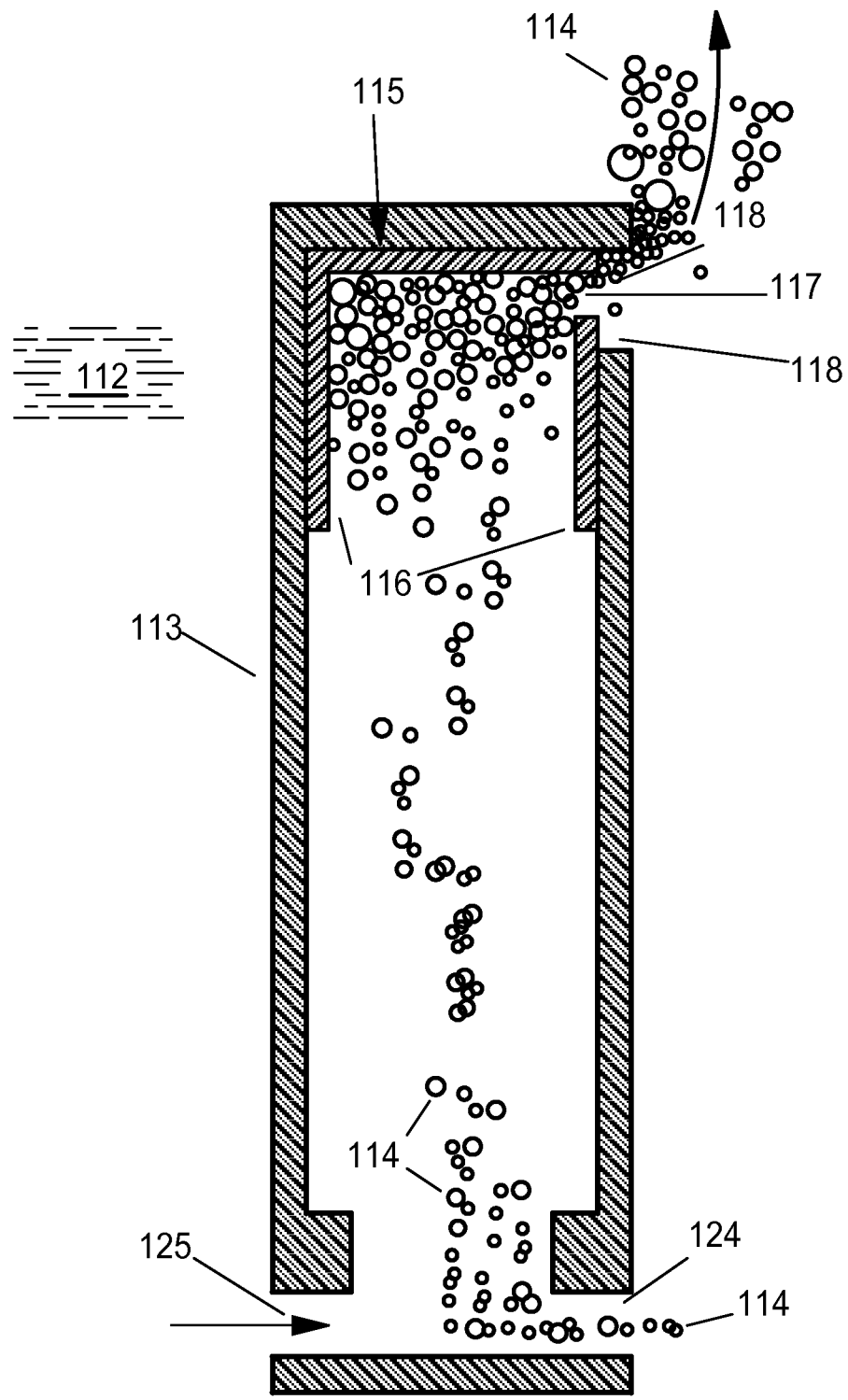
Figure 1D:
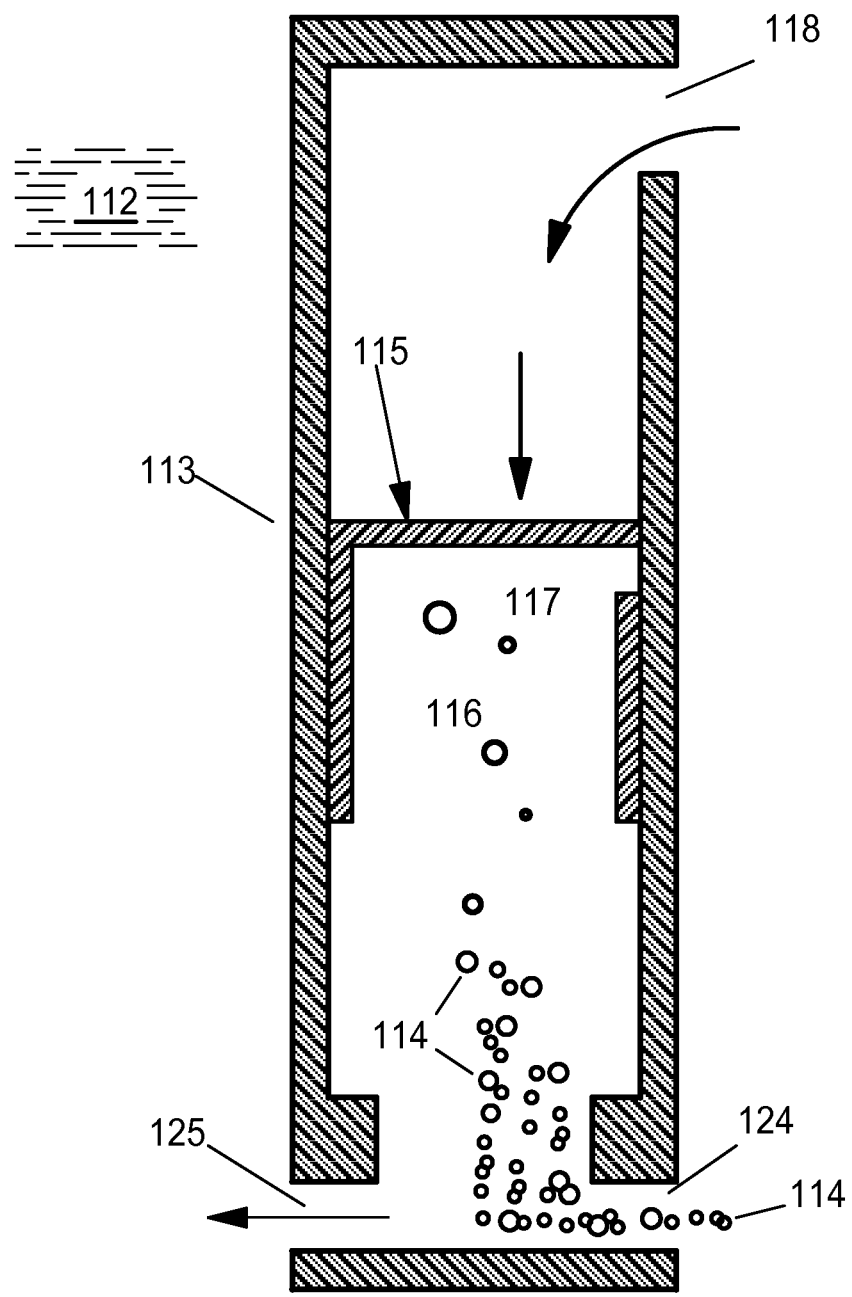

FIG. 1C shows the extreme and unstable position of the movable surface 115 and the container 116 relative to the housing 113. In this position an opening 117 in the container 116 substantially aligns with an opening 118 in the housing 113 thereby allowing the buoyant material 114 to exit into the non-solid material 112. Release of this buoyant material from the container 116 causes the weight of the container 116 to overcome the substantially reduced buoyant force. FIG. 1D shows the container 116 returning to its initial position of FIG. 1A after which the pumping cycle repeats itself.

Figure 2A:
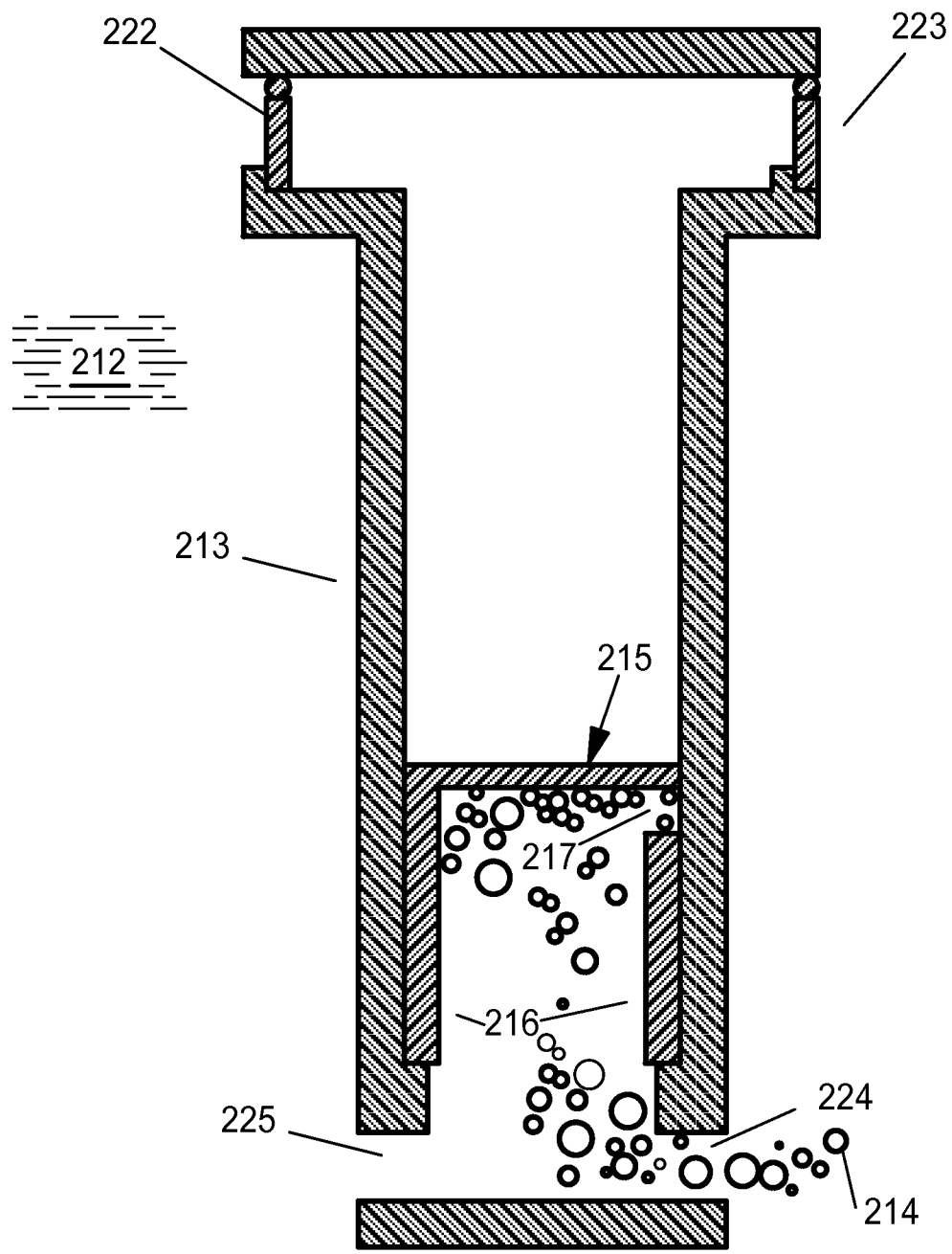
FIG. 2A through FIG. 2D are cross sectional drawings of a cylindrical or rectangular embodiment of a buoyant force pump with inlet and outlet check valves showing the several states of its operation.
Figure 2B:
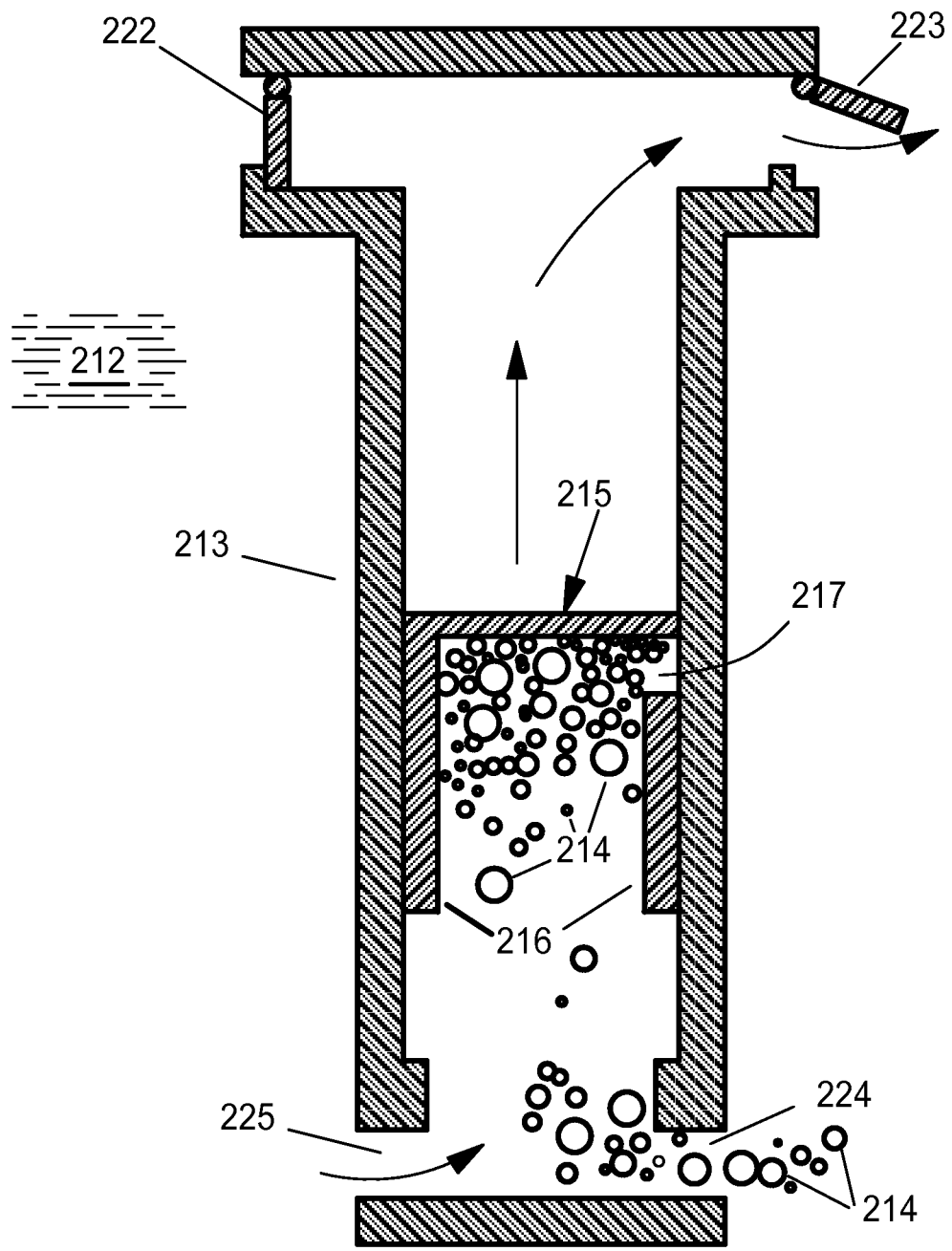
Figure 2C:
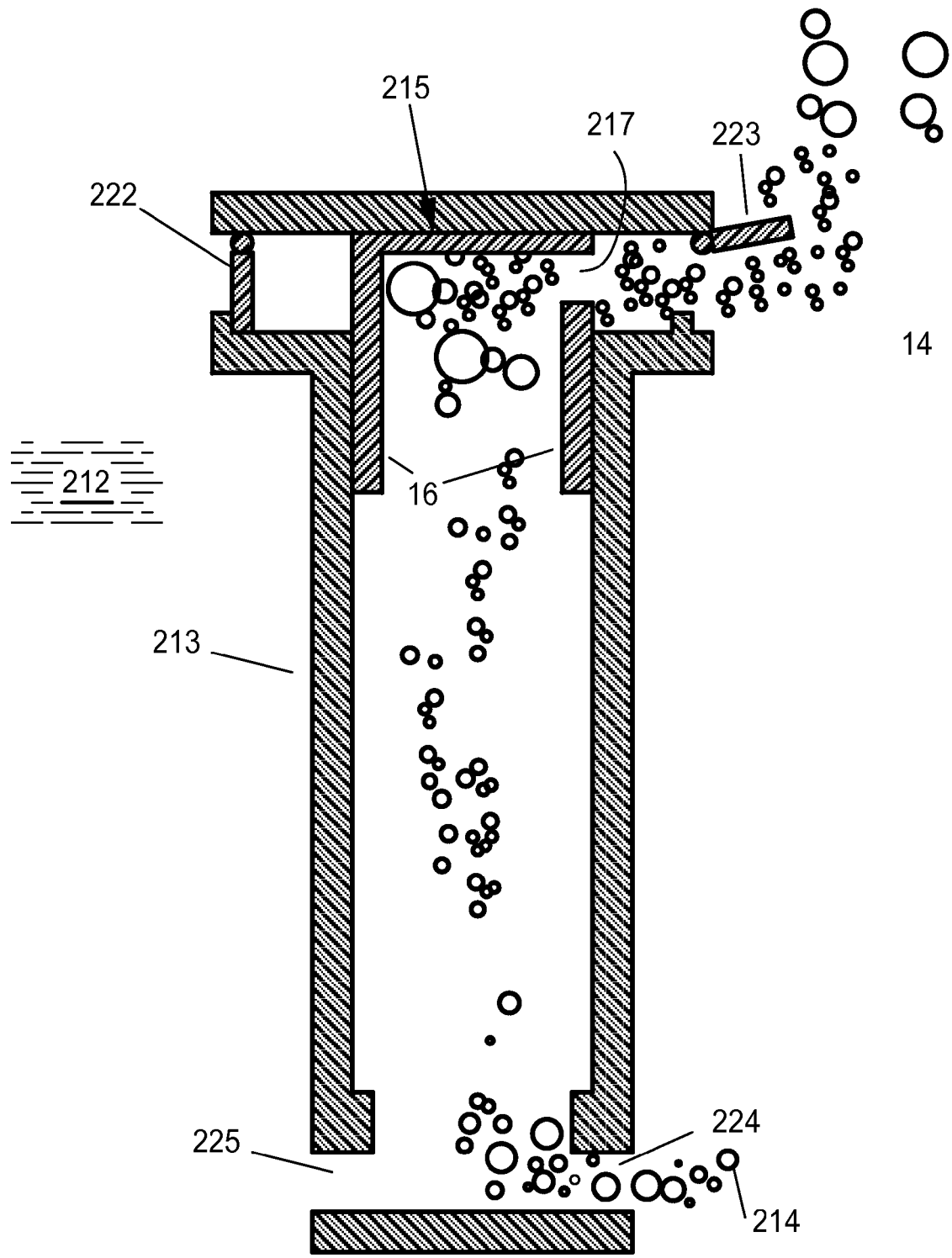
Figure 2D:
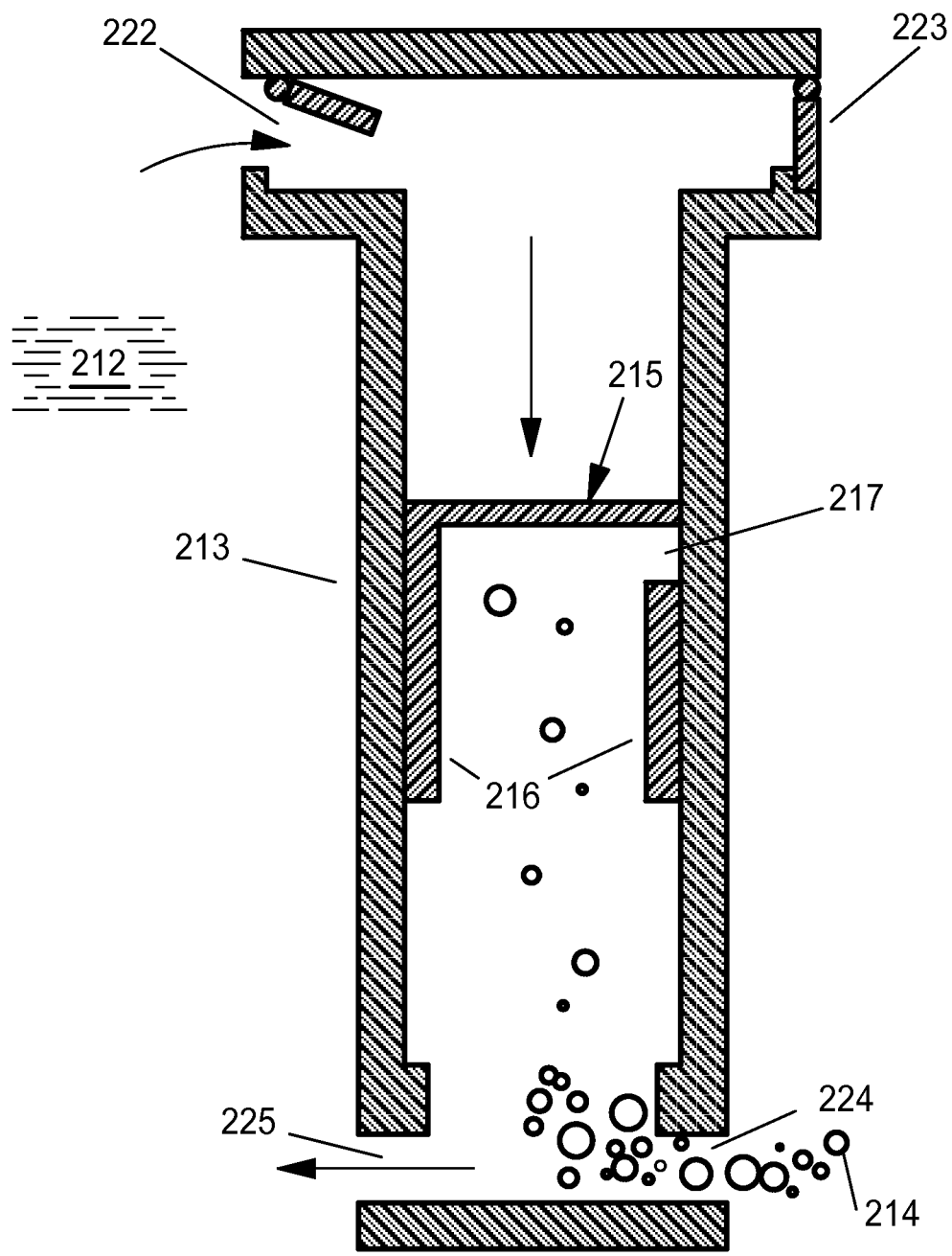

A variation on the linear pump of FIG. 1A through FIG. 1D is shown in FIG. 2A through FIG. 2D. The operation is as shown in FIG. 1 with the addition of an inlet check valve 222 and an outlet check valve 223. FIG. 2A shows the initial configuration. FIG. 2B shows inlet check valve 222 closed and the non-solid material 212 exiting the pump through exit check valve 223 on the upward stroke of the movable surface 215 in response to the buoyant force created by the buoyant material 214 in container 216. FIG. 2C shows the buoyant material 214 exiting through opening 217 in container 216 and through the outlet check valve 223. On the downward stroke of the movable surface 215 and container 216 to their initial positions shown in FIG. 2D, outlet check valve 223 is closed and inlet check valve 222 is open thereby allowing non-solid material 222 to enter into the housing 213.

Figure 3A:
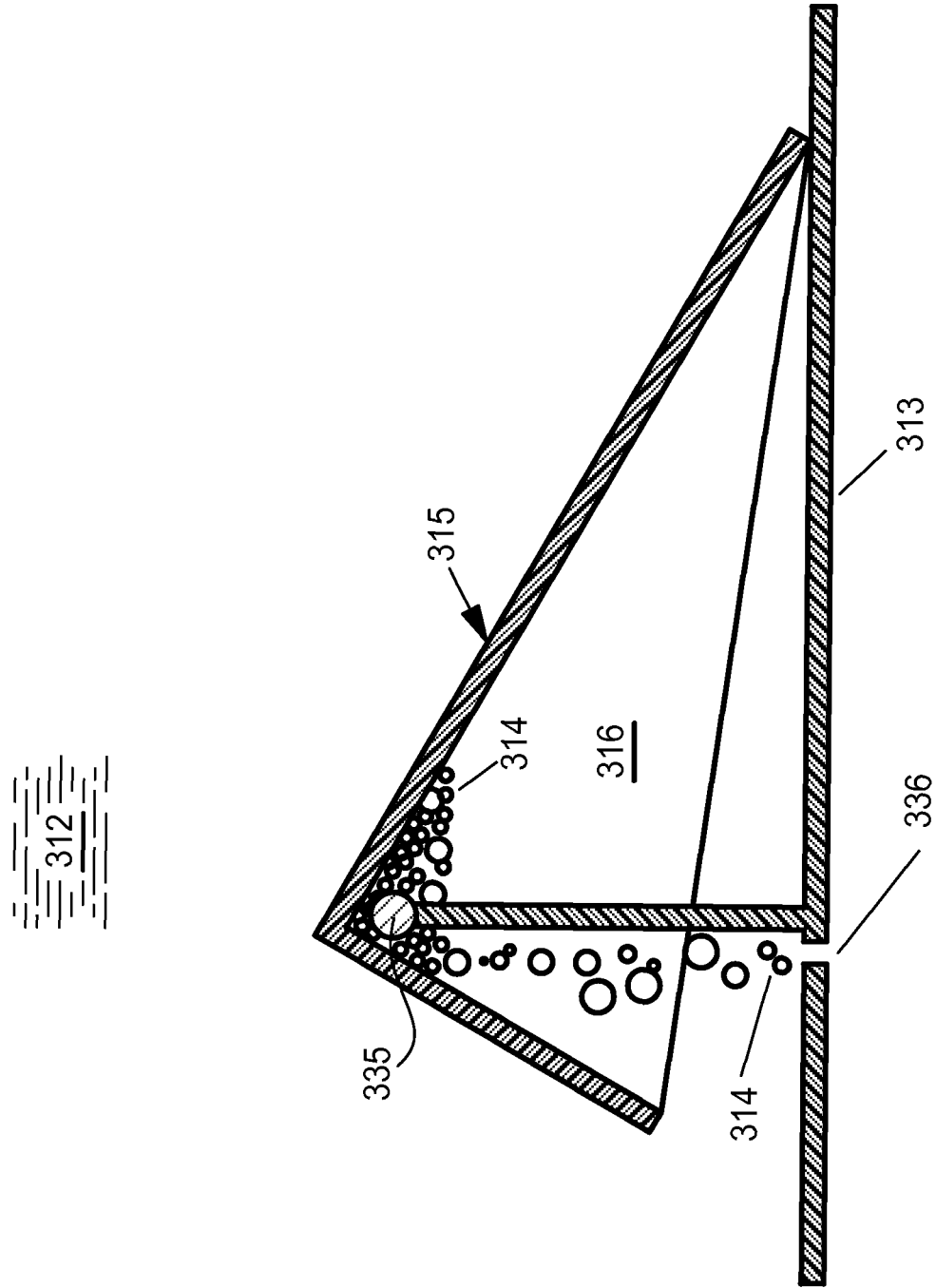
FIG. 3A through FIG. 3C are cross sectional drawings of a submerged, asymmetric, inverted dump bucket which shows the intermittent storage of buoyant material and movement of the container and attached movable surface to cause a surge of non-solid material.
Figure 3B:
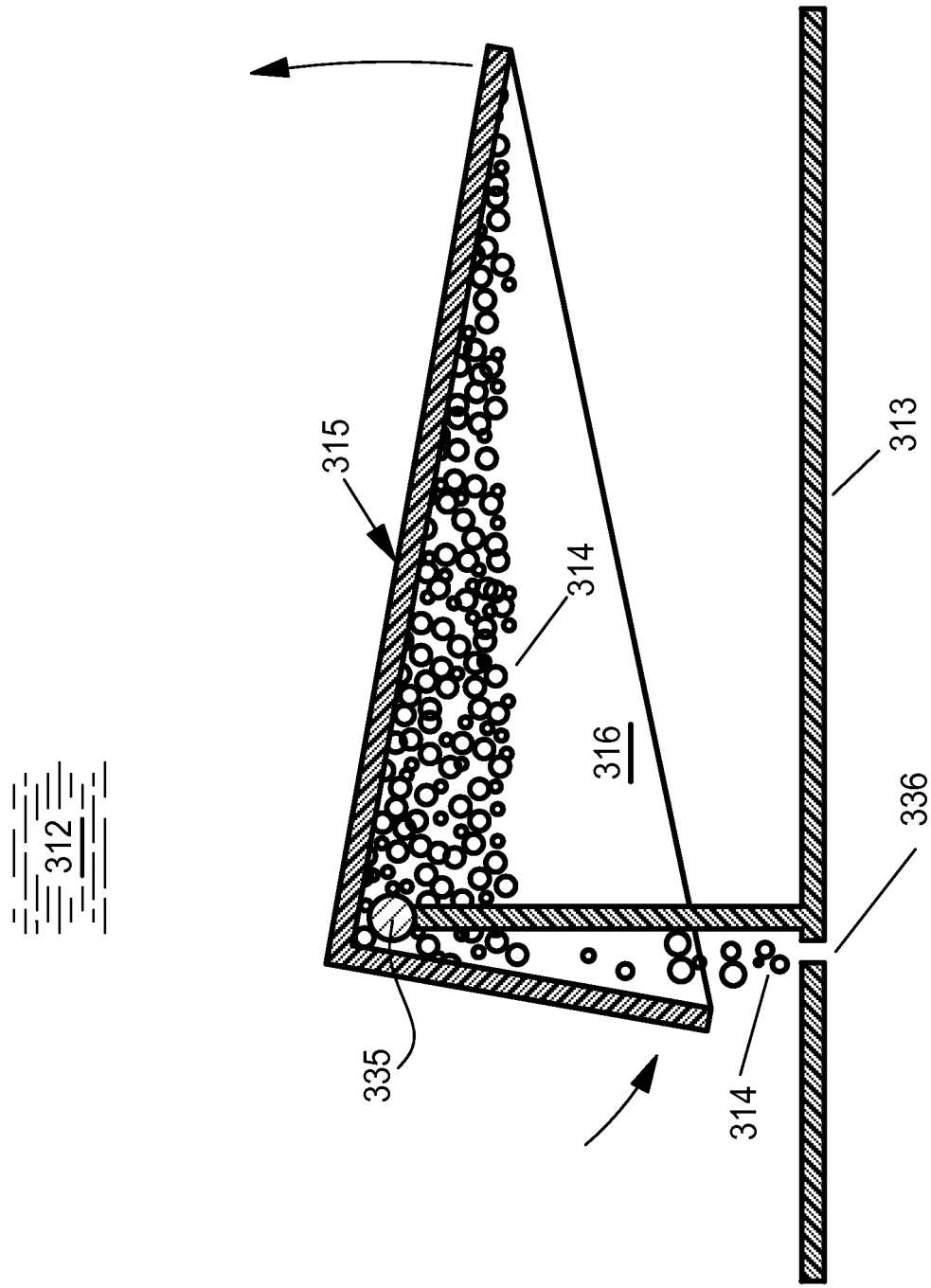
Figure 3C:
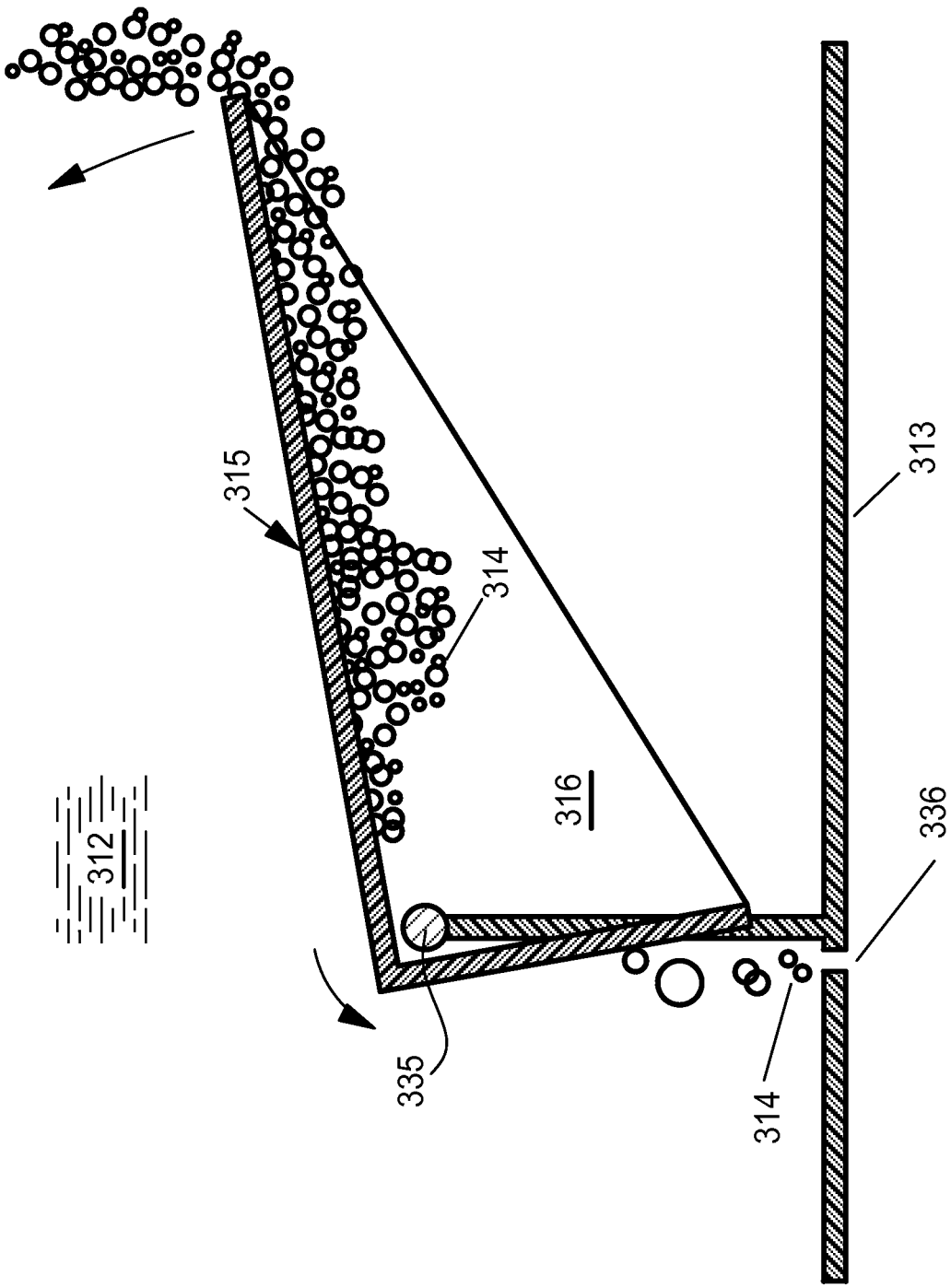

A second simple embodiment will be discussed to explain a rotational embodiment. A support structure 313 contains an axle, hinge, or fulcrum 335 about which the movable surface 315 and container 316 rotate. Buoyant material 314 in the form of moderately compressed air from a conventional aquarium trade air pump enters through inlet orifice 336 to produce bubbles of compressed air 314 which are substantially captured by container 316. The rest or stable position is shown in FIG. 3A. As buoyant material 314 is introduced from input orifice 336, the compressed air 314 accumulates in the container 316 and slowly displaces the non-solid material 312, in this case water, which is already present. FIG. 3B shows the movable surface 315 and container 316 starting to move due to the imbalance of buoyant forces produced by the buoyant material 314 and the asymmetrical shape of the movable surface 315 and container 316. As the movable surface 315 and container 316 start to move, the movable surface 315 causes the displacement of a large quantity of non-solid material 312, in this case water, and the movable surface 315 and container 316 move. As the asymmetrical movable surface 315 and container 316 reach an approximately horizontal orientation in FIG. 3C, captive air 314 is released due to its buoyant force and an additional surge of water 312 occurs. Once the buoyant material 314 is released from the movable surface 315 and container 316, the imbalance in the gravitational forces on the asymmetrical movable surface 315 and container 316 about the movable support 335 cause it to return to its original rest position where the cycle begins again. Note that the amount of non-solid material 312 displaced can be much larger than the volume of the buoyant material 314. Note also that the orifice 336 does not need to be immediately below the container 316, but can be in such a position and orientation that the pressure of the buoyant material 314 when leaving the orifice 336 causes a usable portion of the buoyant material 314 to be captured by the container 316.

Figure 4:
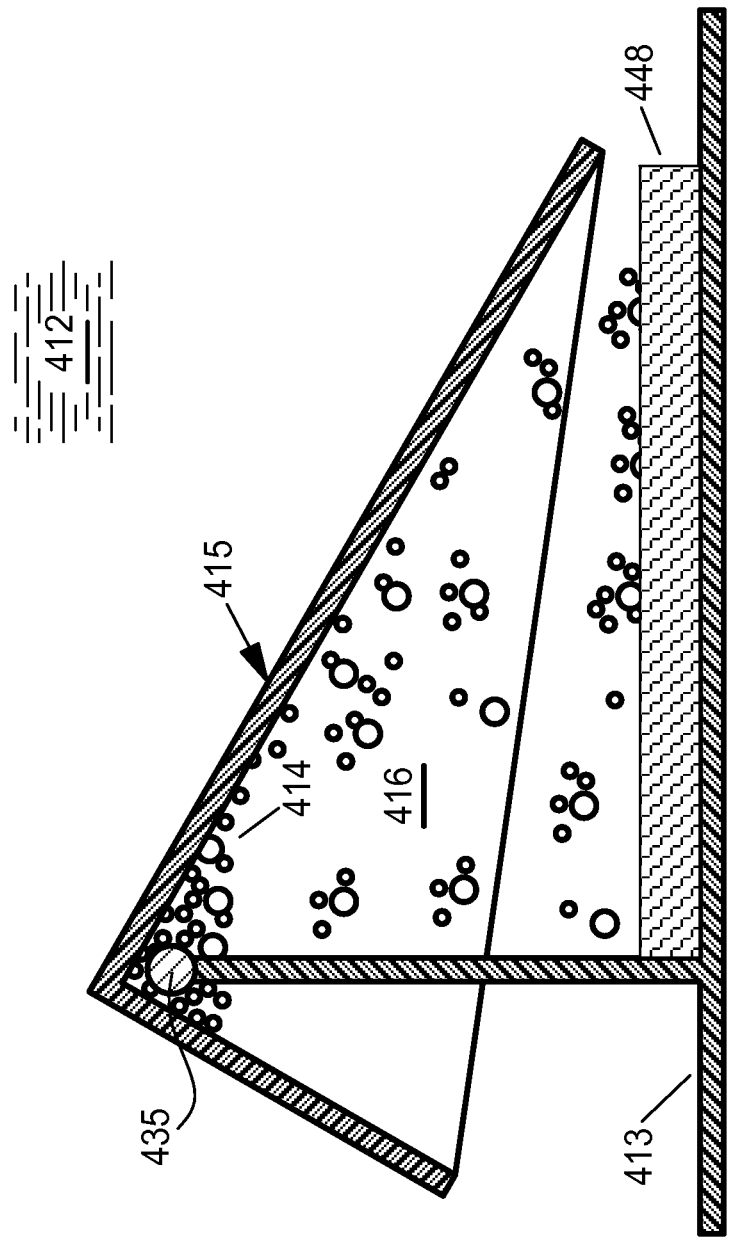
FIG. 4 is a cross sectional drawing of a submerged, asymmetric, inverted dump bucket in which the buoyant force is generated by a reactive material or an active biological material such as an algae mat.

It can also be seen in FIG. 4 that an orifice is not essential if the container 416 is placed over a man-made reactive surface or a naturally occurring release of buoyant material 448 such as gases created by decomposing biota, buoyant hot fluids over deep sea vents, or respiration products of underwater algae. That is, biological production can create the buoyant materials 414 and no external source of man-made energy is required to cause the pumping action to occur.

Figure 5A:
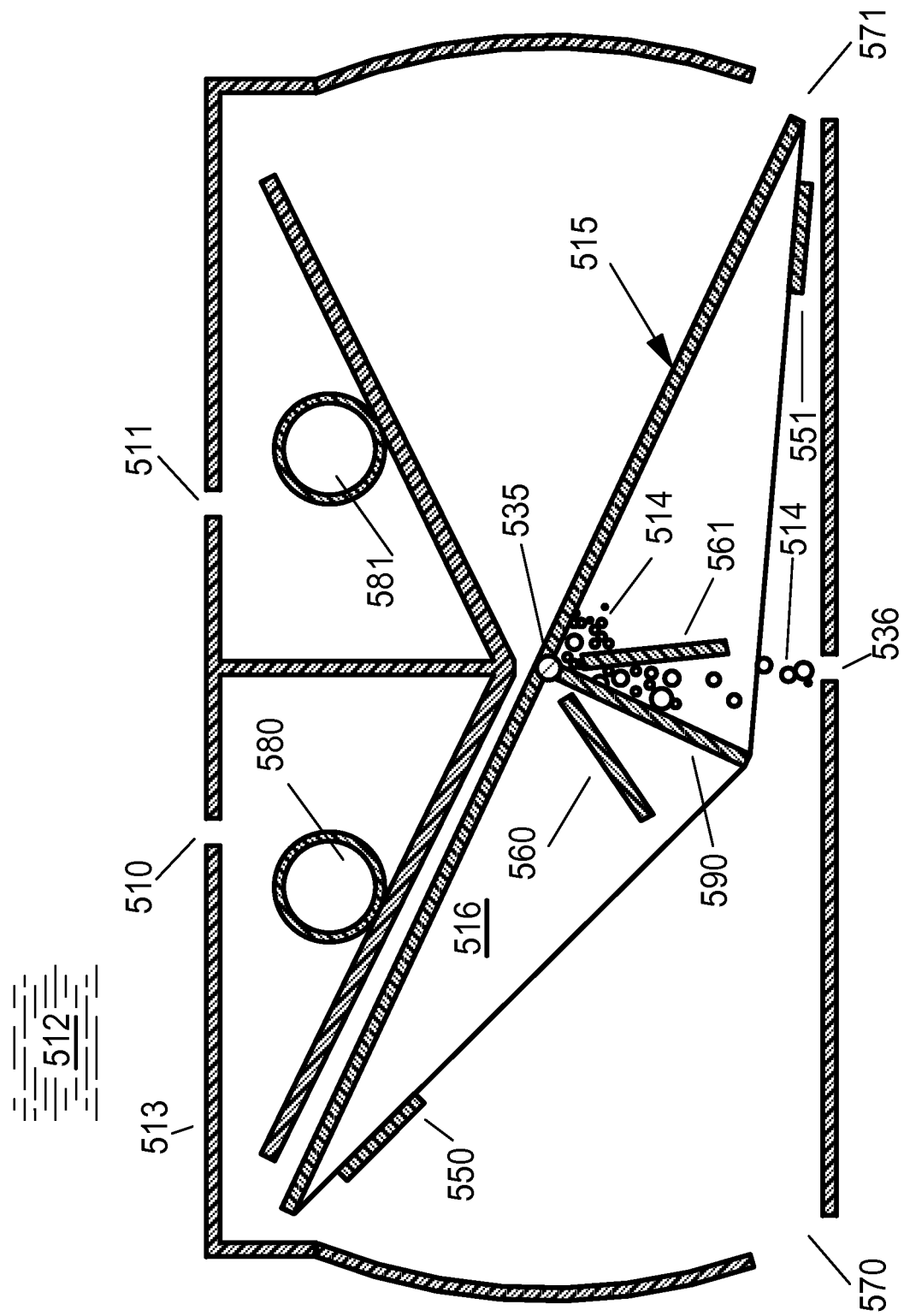
FIG. 5A through FIG. 5E are cross sectional drawings of a non-solid material pump which has two stable positions and baffles internal to the housing to enhance and direct the flow of non-solid material. The sequence of drawings shows the operation of the movable container and attached surface in response to the introduction of buoyant material.

FIG. 5A through FIG. 5E are cross-sectional drawings of another configuration of a pump in which there are two stable states and the housing 513 is configured so as to contain and direct the flow of non-solid material 512. FIG. 5A shows the configuration of components at a first stable configuration in which the buoyant material 514 is entering through input orifice 536 and buoyant material 514 is being substantially captured in container 516 between right baffle 561 and center baffle 590. There is a separation between baffle 561 and the center baffle 590 and container 516 at the top allowing later release of contained buoyant material 514. Shown in outline form as part of container 516 are the front and back sides which serve to contain the lateral motion of buoyant material 514. In FIG. 5A the buoyant material 514 entering the container 516 between the right baffle 561 and center baffle 590 produces a buoyant force to the left of axle 535 which insures the completion of the previous pump half-cycle. This left side force causes the movable surface 515 to more substantially complete its movement to an extreme clockwise position as a result of the previous transition from the second stable position to the first stable position. The entire pump is immersed in a non-solid material 512.

Figure 5B:
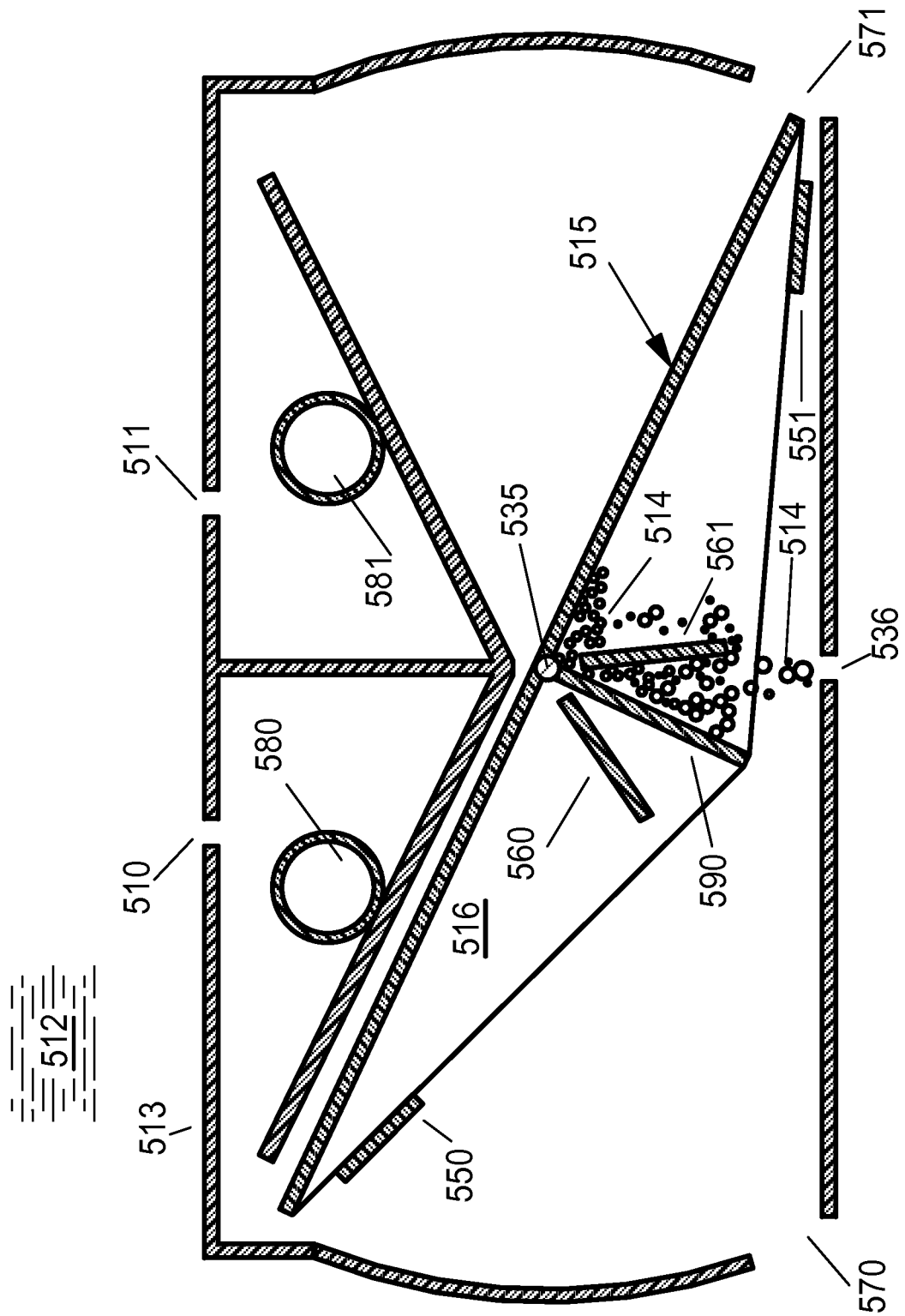
Figure 5C:
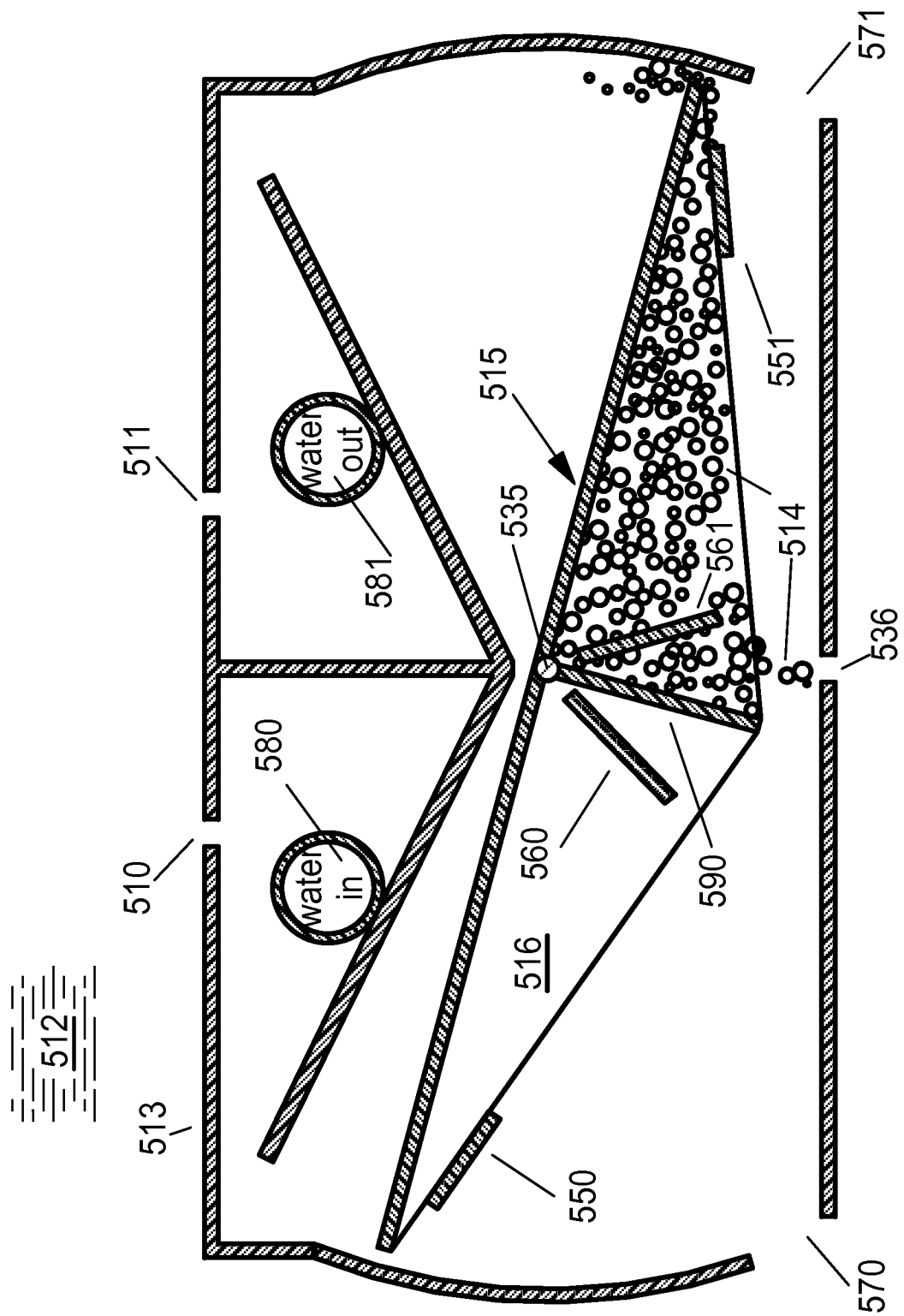

FIG. 5B shows the motion of buoyant material 514 as it overflows the volume between the right baffle 561 and center baffle 590 thereby filling the rest of the container 516. The buoyant force to the right of movable surface axle 535 does not yet overcome the buoyant force to the left of the axle 535. FIG. 5C shows the initial motion of the movable surface 515 in response to the buoyant material 514 contained to the right of axle 535 producing a buoyant force sufficient to overcome the buoyant force to the left of axle 535. This imbalance of forces urges the container 516 with attached movable surface 515 to rotate counterclockwise about axle 535. In so moving, the non-solid material 512 is contained between the housing 513 and front and back sides which are shown in outline form and the movable surface urging the non-solid material to flow to and through opening 581 in the not shown near side of the housing 513. In a reverse manner, non-solid material is urged to flow into housing opening 580.

Figure 5D:
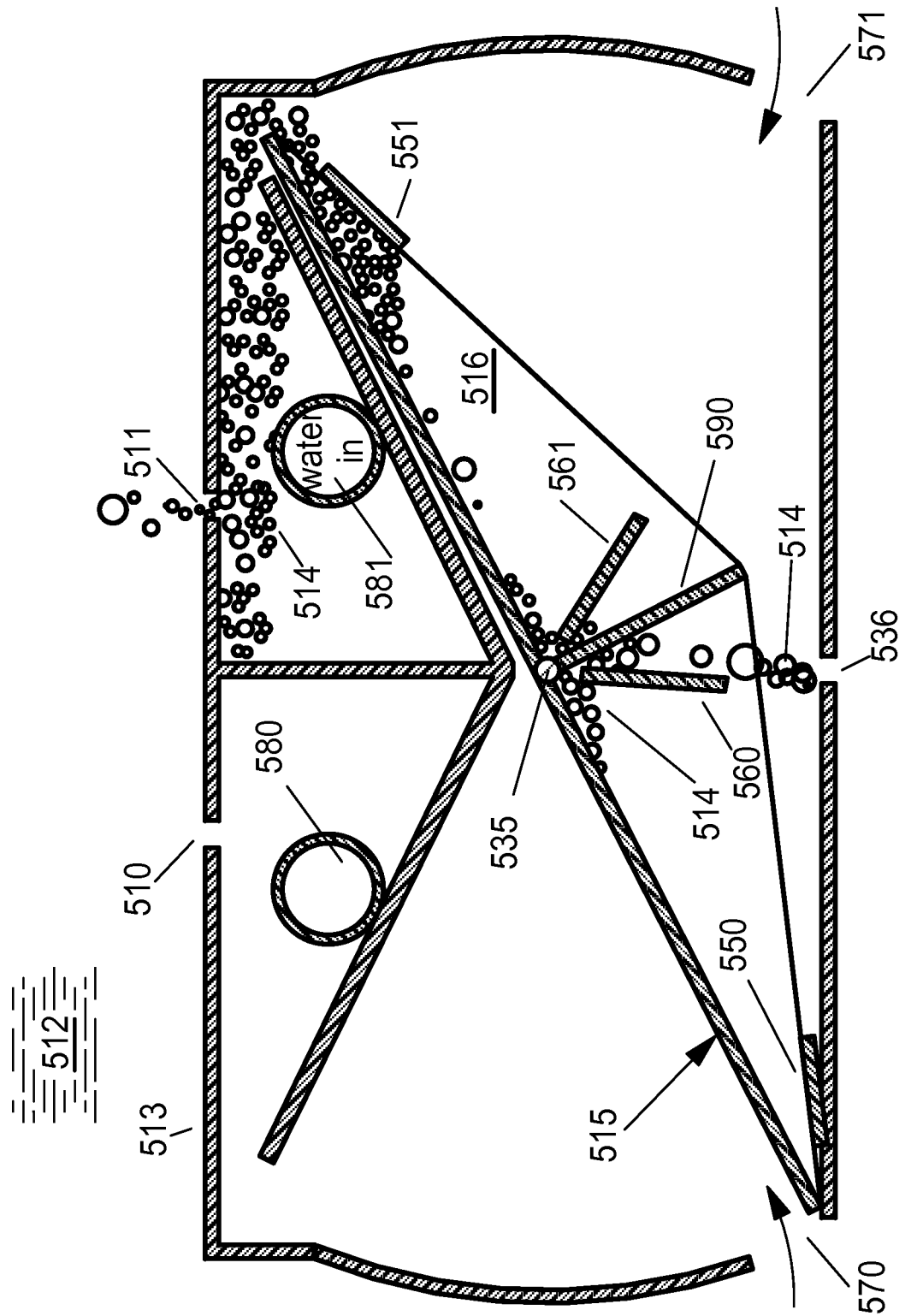

FIG. 5D shows the near completion of the transition between a first stable position and a second stable configuration. The buoyant material 514 is being released from the container into the upper portion of the housing 513. The upper portion of the housing 513 acts as an accumulator to slow the release of the buoyant material 514 through exit orifice 511 into the non-solid material 512, thereby reducing the deleterious effect of a large bubble of buoyant material 514 rapidly rising to the surface of the non-solid material 512. As the buoyant material 514 exits the housing 513 through exit orifice 511, non-solid material enters through housing opening 571 to replace the buoyant material 514. FIG. 5D also shows the volume between the container 516 walls and the left baffle 560 and center baffle 590 beginning to fill with buoyant material 514, thereby urging the movable surface 515 to complete its movements to its second stable state. Baffle 551 serves to contain the buoyant material 514 in the container 516 to provide a longer duration for the application of the buoyant force since the container 516 is open on the bottom side.

Figure 5E:
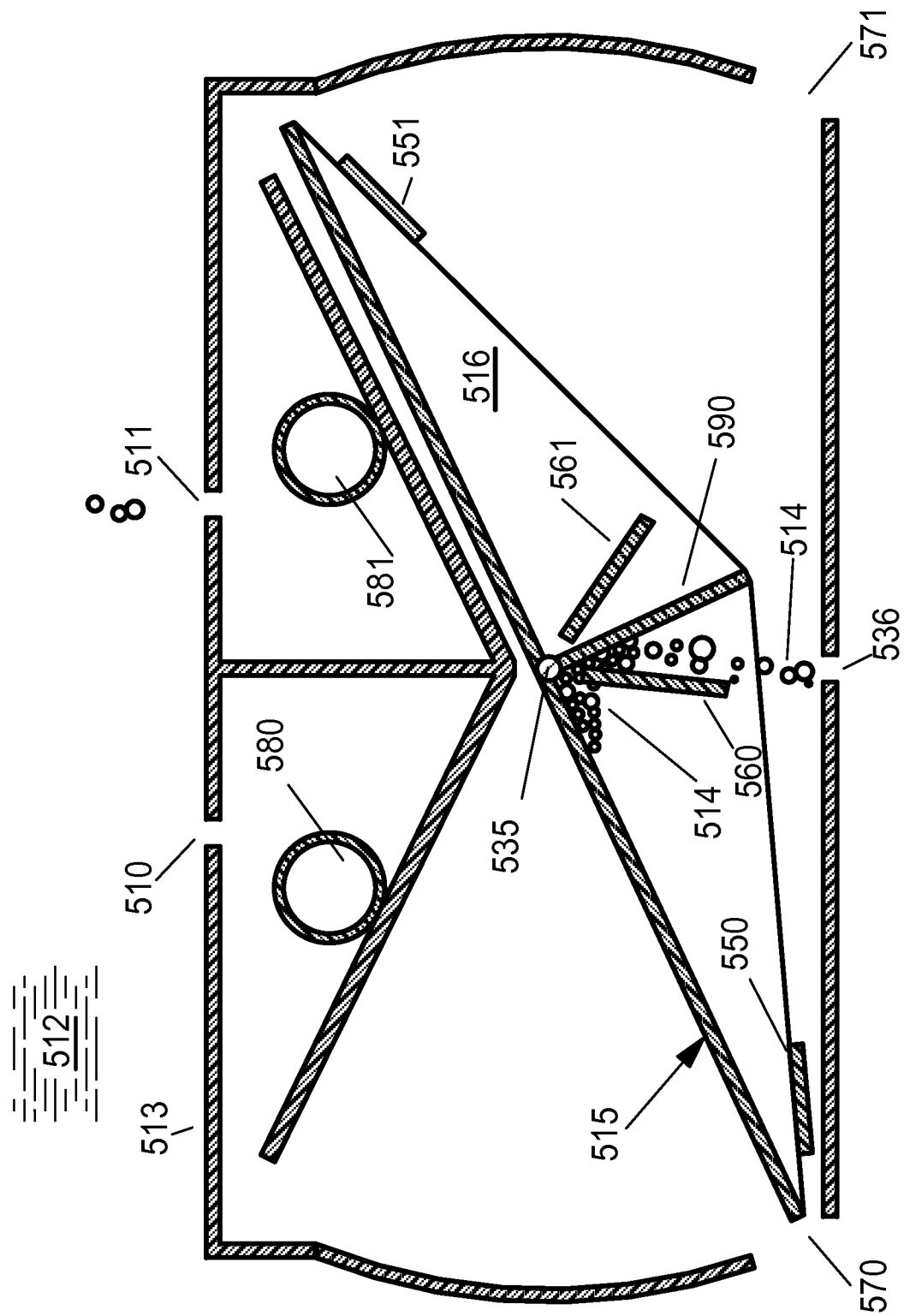

FIG. 5E shows the completion of the first half cycle in which the accumulator portion of housing 513 to the right of the axle 535 is substantially empty of buoyant material 514 and the container to the left of the axle 535 is beginning to contain buoyant material 514 for the start of the second half of a complete cycle. The second half of a complete cycle behaves essentially as the mirror image of FIG. 5A through FIG. 5E about the vertical axis through axle 535.

Figure 6A:
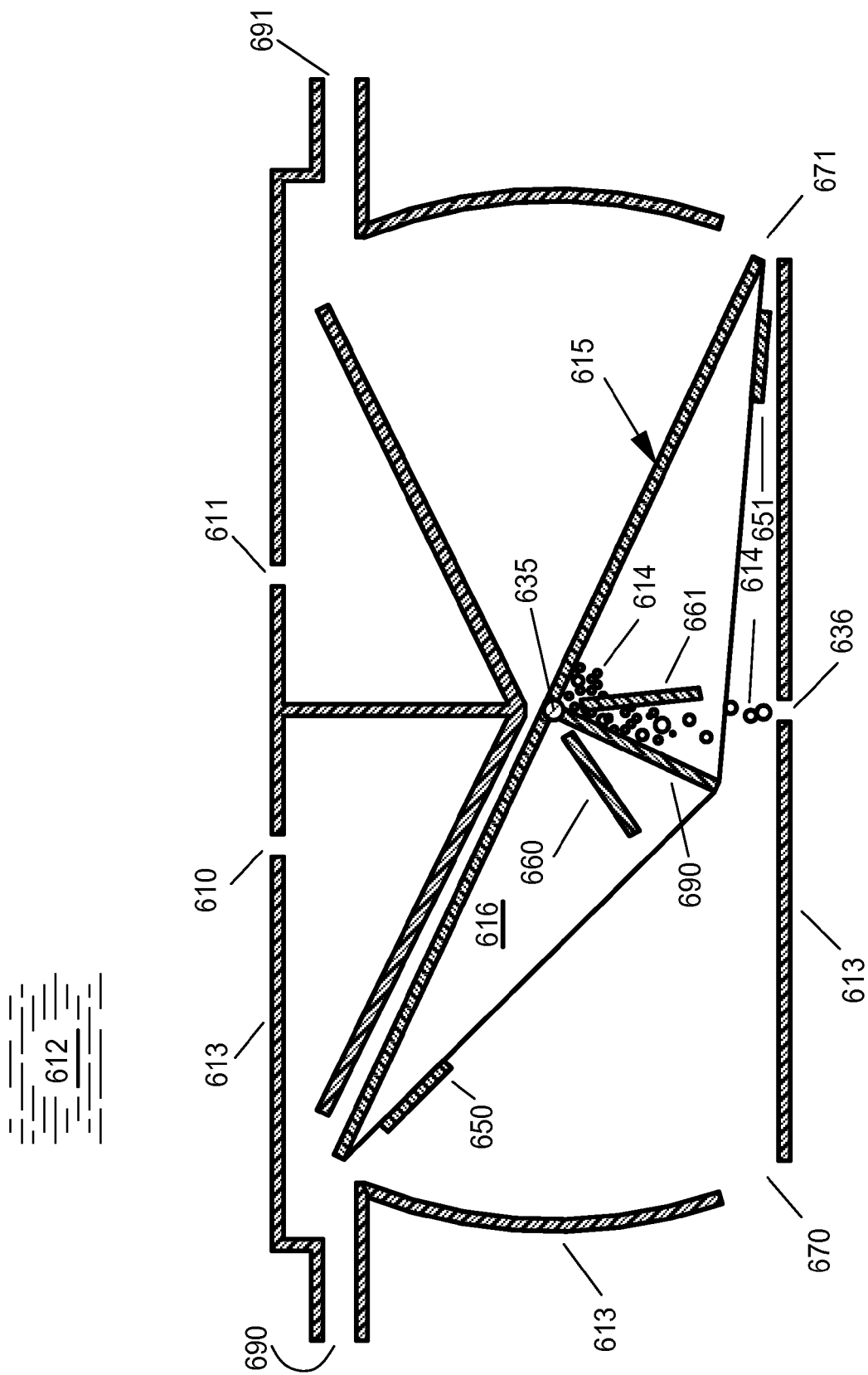
FIG. 6A through FIG. 6E are cross sectional drawings of a non-solid material pump with an alternative non-solid material outlet configuration to that shown in FIG. 5A through FIG. 5E. The sequence of drawings shows the operation of the movable container and attached surface and container in response to the introduction of buoyant material.

FIG. 6A through FIG. 6E are cross-sectional drawings of another pump configuration in which there are two stable states and housing 613 is configured so as to contain and direct the flow of non-solid material 612 through housing opening 690 and housing opening 691. FIG. 6A shows the configuration of components at a first stable configuration in which the buoyant material 614 is entering through input orifice 636 and being substantially captured in the container 616 between right side baffle 661 and center baffle 690. There is a separation between baffle 661 and the center baffle 690 and the container 616 at the top allowing later release of contained buoyant material 614. Shown in outline form are the front and back sides of the container 616 which serve to contain the lateral motion of buoyant material 614. In FIG. 6A the buoyant material 614 entering the container 616 between the baffles produces a buoyant force on the left side of the mechanism which is the completion of the previous pump half cycle. This force causes the movable surface 615 to more substantially complete its movement to an extreme position. The entire pump is immersed in a non-solid material 612.

Figure 6B:
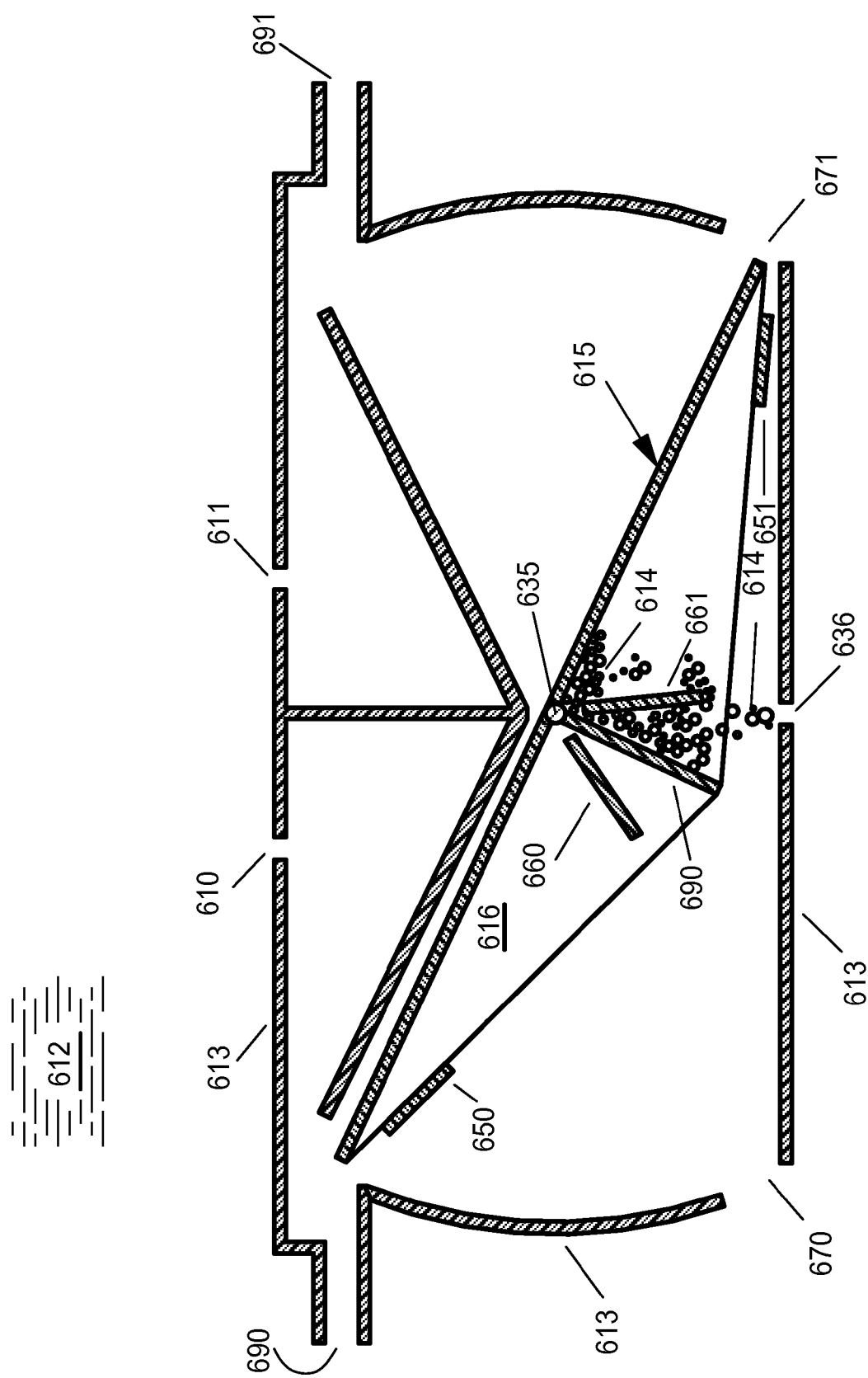
Figure 6C:
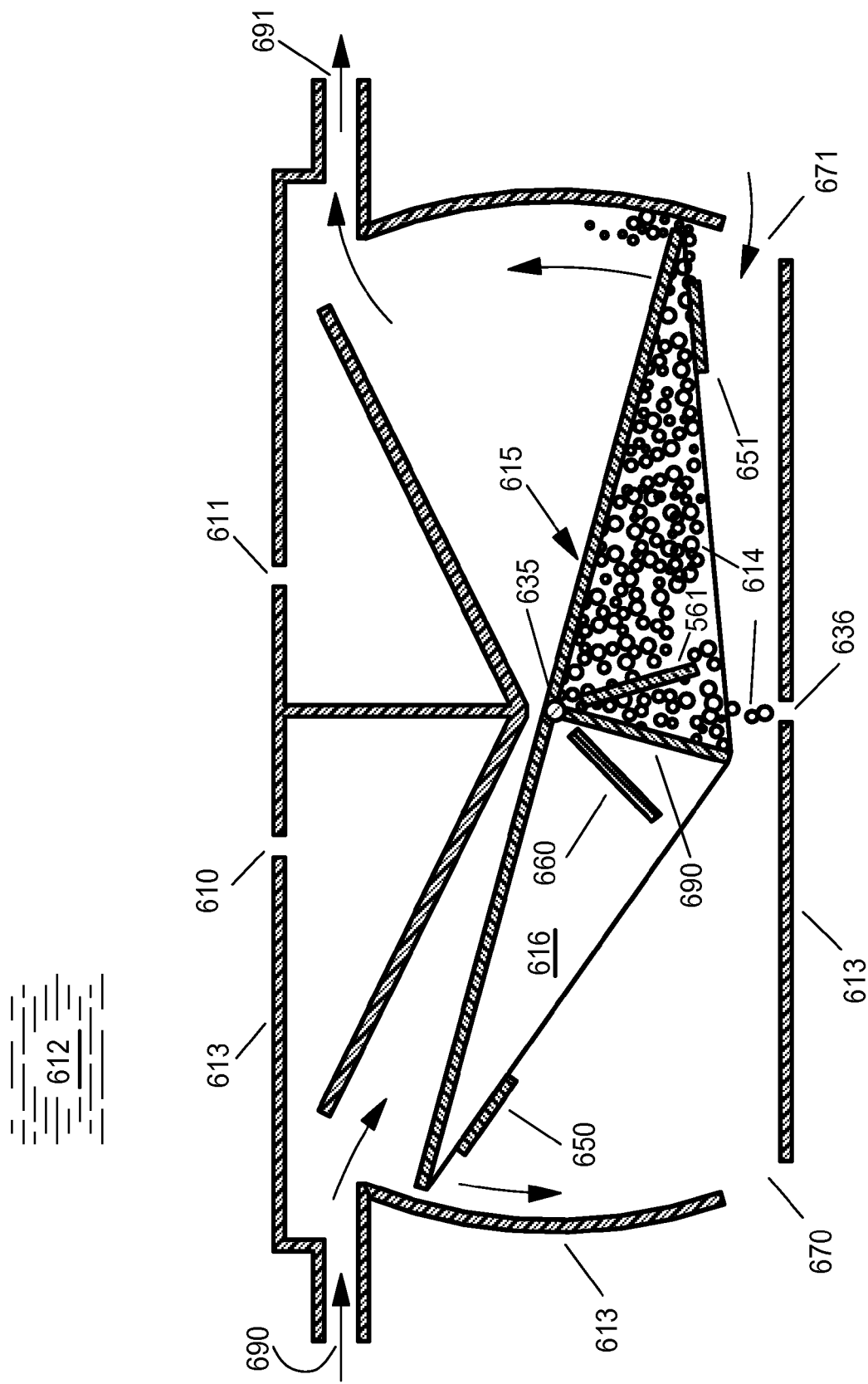

FIG. 6B shows the motion of buoyant material 614 as it overflows the volume between the right baffle 661 and center baffle 690 thereby filling the rest of the container 616. The buoyant force to the right of movable surface axle 635 does not yet overcome the buoyant force to the left of the axle 635. FIG. 6C shows the initial motion of the movable surface 615 in response to the force produced by the buoyant material 614 contained to the right of axle 635 producing a buoyant force sufficient to overcome the buoyant force to the left of axle 635. This imbalance of forces urges container 616 with attached movable surface 615 to rotate counterclockwise about axle 635. In so moving, the non-solid material 612 is contained between the sides of housing 613 and the movable surface urging it to flow to and through opening 691 in the right side of housing 613. In a reverse manner, non-solid material is urged to flow into housing opening 690 on the left side of housing 613.

Figure 6D:
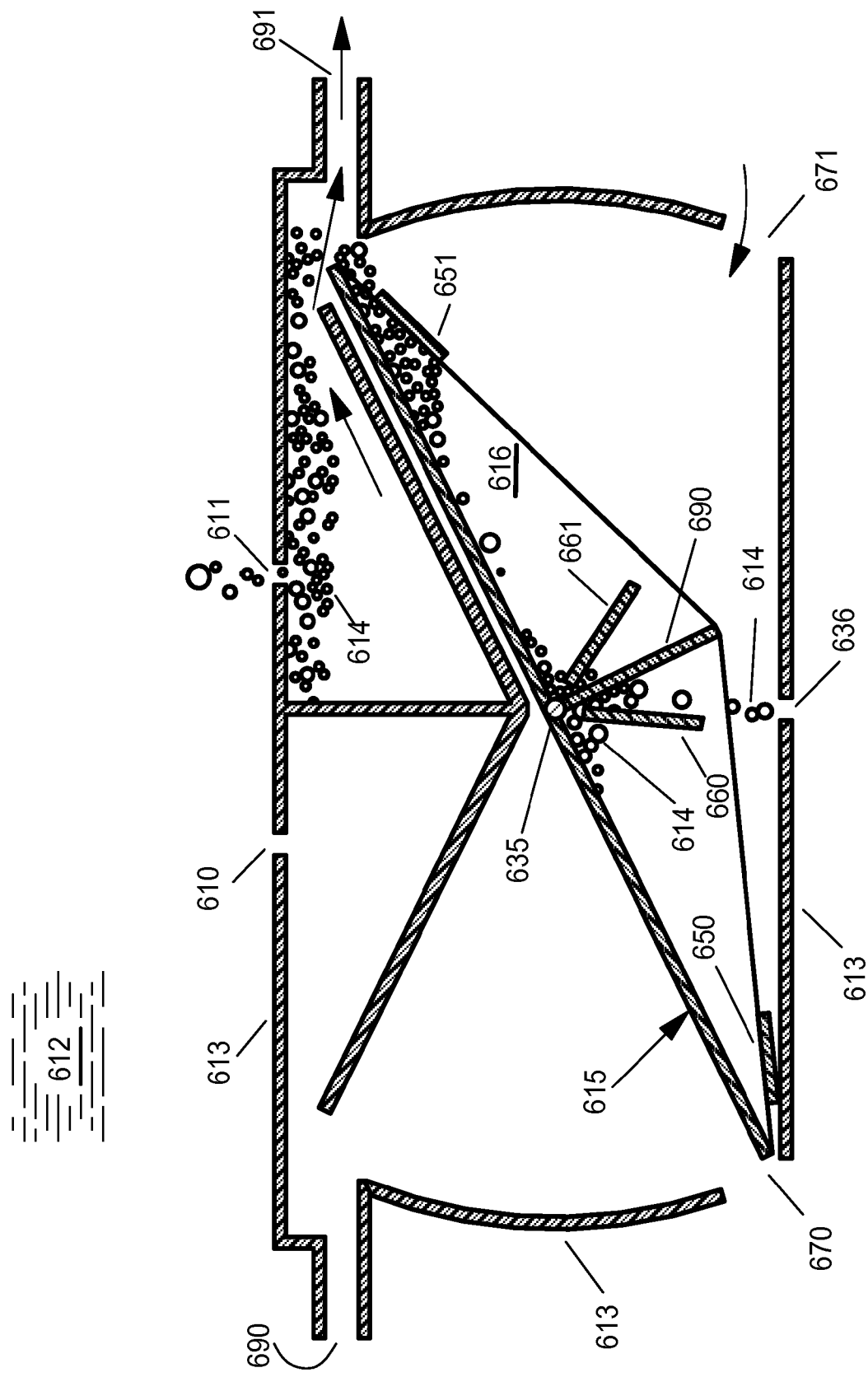
Figure 6E:
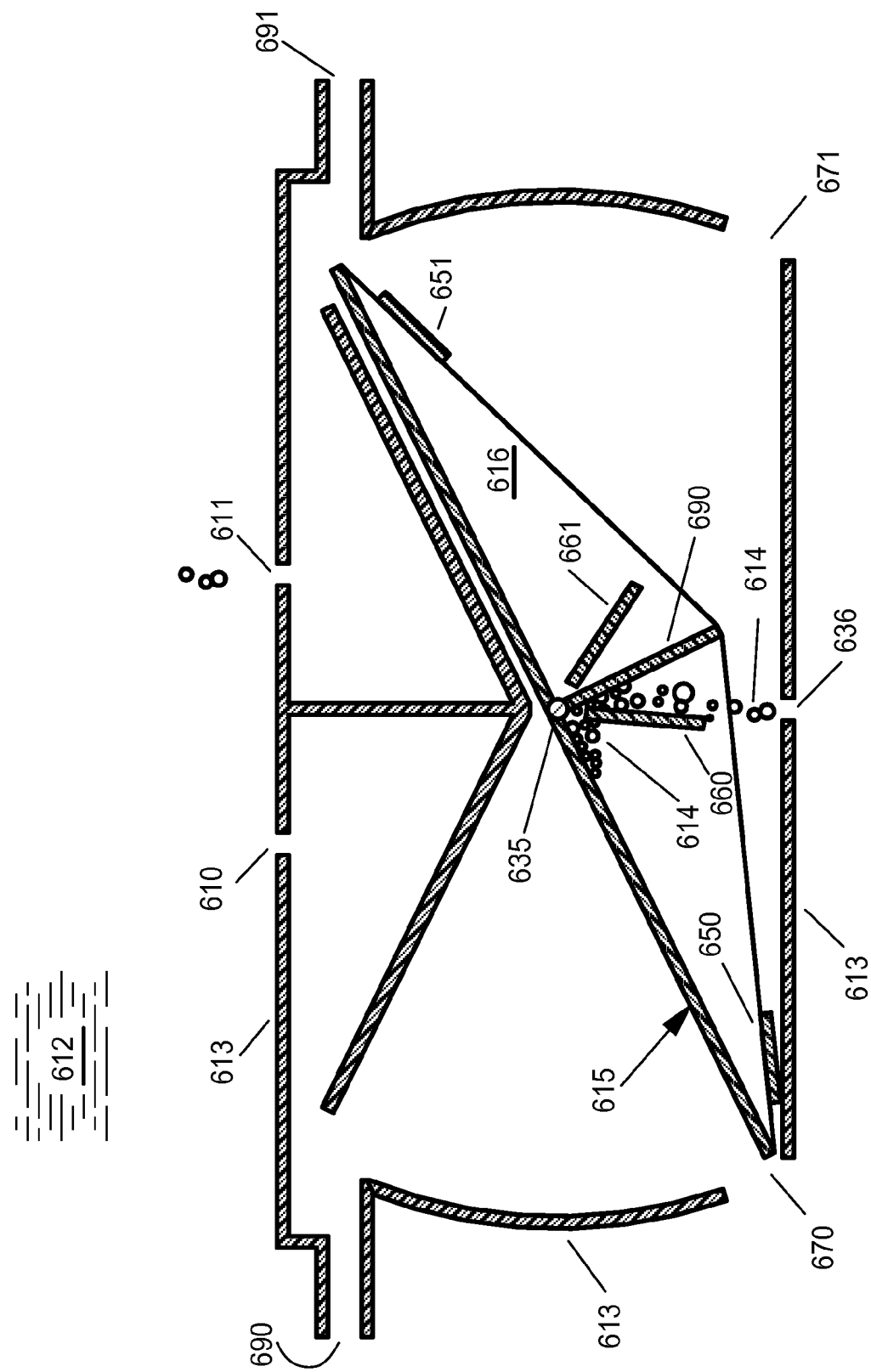

FIG. 6D shows the near completion of the transition between a first stable position and a second stable configuration. The buoyant material 614 is being released from the container 616 into the upper portion of the housing 613. The housing acts as an accumulator of buoyant material 614 to slow the release of the buoyant material 614 through right exit orifice 611 into the non-solid material 612, thereby reducing the deleterious effect of a large bubble of buoyant material 614 rapidly rising to the surface of the non-solid material 612. As the buoyant material moves towards the right exhaust orifice 611, the non-solid material contained by the housing is urged towards the housing opening 691. When the buoyant material is substantially contained in the accumulator portion of the housing, non-solid material reenters the housing through housing opening 671 to replace the buoyant material as it exits through right exit orifice 611. Baffle 651 serves to contain the buoyant material 614 in the container 616 to provide a longer duration buoyant force since the container is open on the bottom side. FIG. 6E shows the pump after the surge of non-solid material through housing opening 691 and the completion of the first one half cycle of the pump. Buoyant material 614 is now filling the volume between left baffle 660 and center baffle 690 beginning the second half of the cycle which is essentially the same as the first half cycle but in the opposite rotational direction.

Figure 7A:
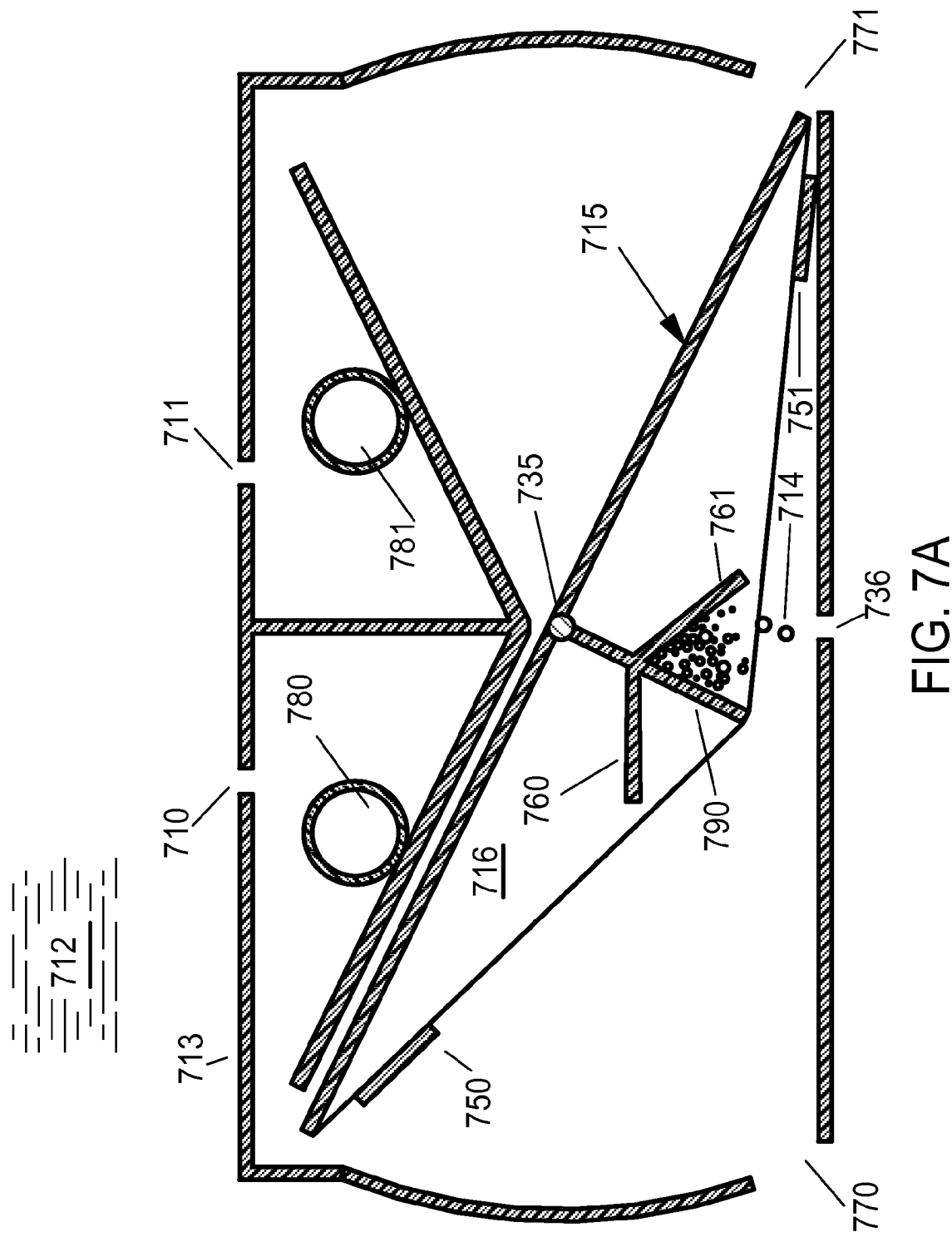
FIG. 7A through FIG. 7E are cross sectional drawings of a non-solid material pump with an alternative container baffle configuration to that shown in FIG. 5A through FIG. 5E. The sequence of drawings shows the operation of the movable container and attached surface in response to the introduction of buoyant material.

FIG. 7A through FIG. 7E show cross-sectional drawings of another pump configuration in which there are two stable states and the housing 713 is configured so as to contain and direct the flow of non-solid material 712. FIG. 7A shows the configuration of components in a first stable configuration in which the buoyant material 714 is entering through input orifice 736 and being substantially captured in the container 716 between center baffle 790 and right baffle 761. Note that baffle 760 and baffle 761 are in a different configuration from the previously presented figures and there is no opening between baffle 760 and baffle 761 and center baffle 790 and the container 716. Baffle 760 and baffle 761 are configured so as to contain the buoyant material 714 in such a manner so as to provide a buoyant force to urge the completion of the movable surface 715 motion from one stable state to the next stable state while substantially releasing all buoyant material 712 near the end of each half cycle. Shown in outline are front and back sides of the container 716 which serve to contain the lateral motion of buoyant material 714. In FIG. 7A the buoyant material 714 entering the container 716 between the right baffle 761 and center baffle 790 produces a buoyant force on the left side of the mechanism which is the completion of the previous pump cycle. This left side force causes the container 716 and attached movable surface 715 to more substantially complete their movement to an extreme position of the previous half cycle. The entire pump is immersed in a non-solid material 712.

Figure 7B:
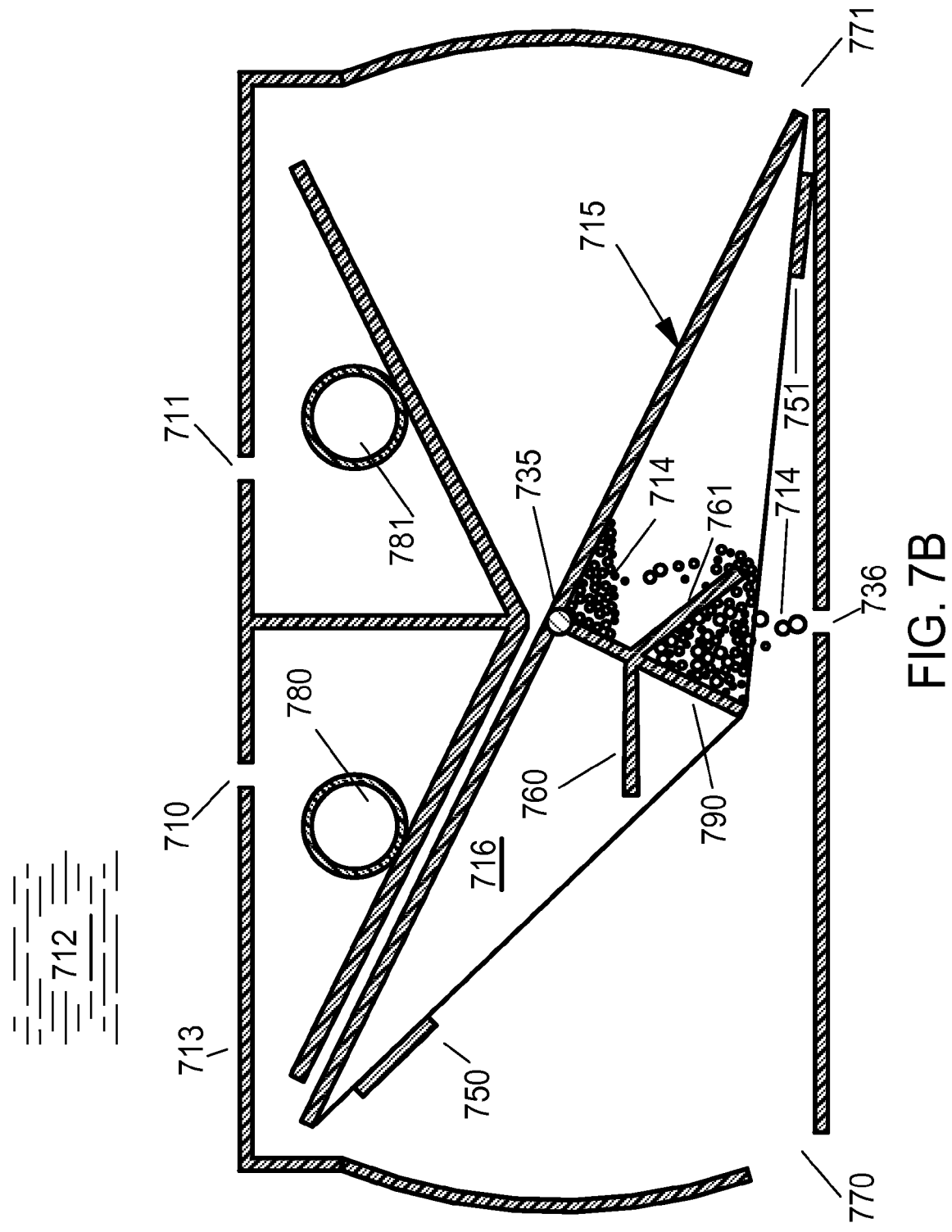
Figure 7C:
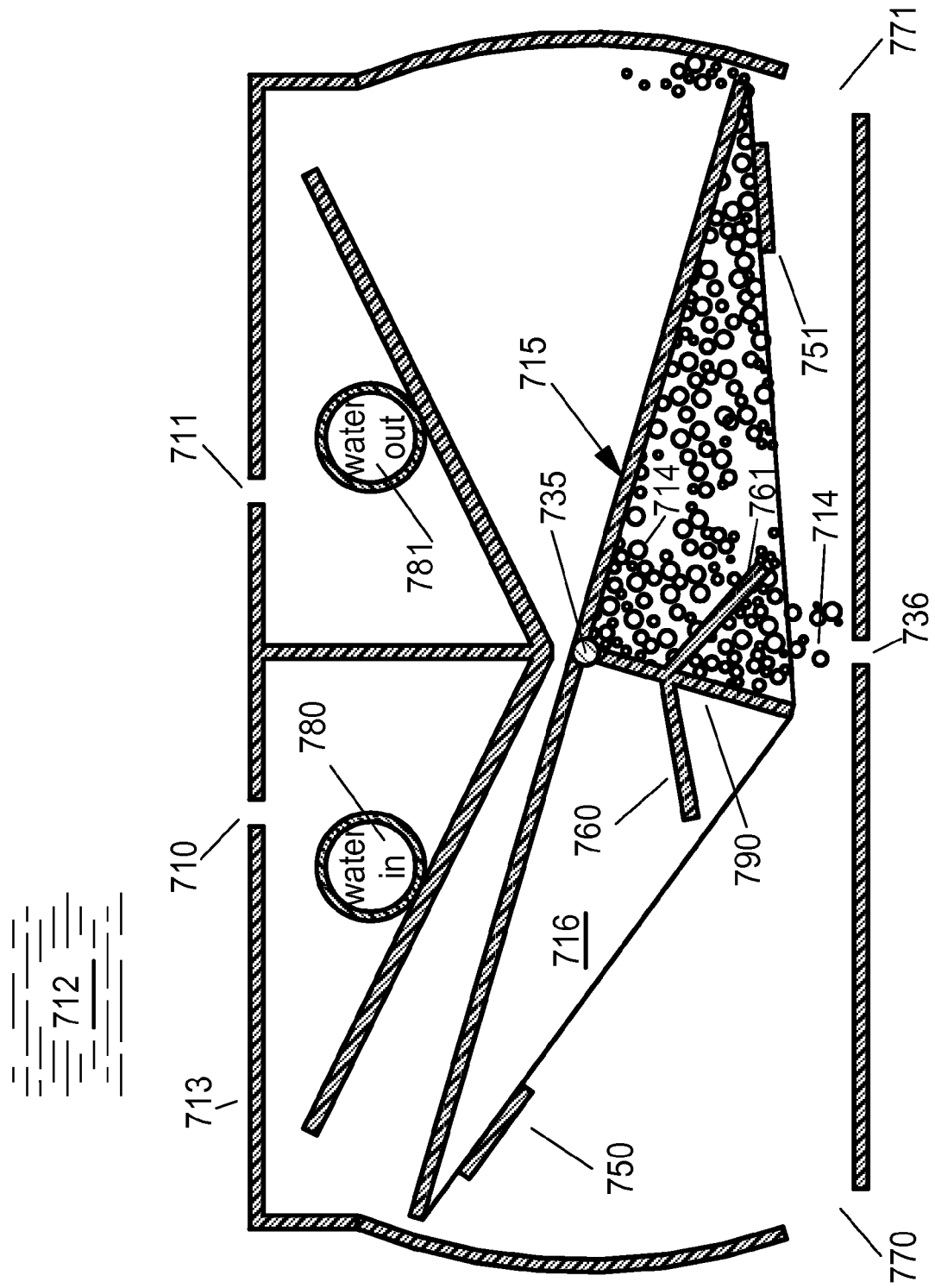

FIG. 7B shows the motion of buoyant material 714 as it overflows the volume between right baffle 761 and center baffle 790 thereby starting to fill the rest of the container 716. The buoyant force to the right of movable surface axle 735 does not yet overcome the buoyant force to the left of the movable surface axle 735. FIG. 7C shows the initial motion of the container 716 and attached movable surface 715 in response to the force produced by buoyant material 714 contained to the right of axle 735 producing a buoyant force sufficient to overcome the buoyant force to the left of axle 735. This imbalance of forces urges the container 716 with attached movable surface 715 to rotate counterclockwise about axle 735. In so moving, the non-solid material 712 is contained between the housing 713 and the movable surface urging it to flow to and through opening 781 in the not shown near side of the housing 713. In a reverse manner, non-solid material is urged to flow into housing opening 780. Housing opening 780 and housing opening 781 can be in either the near or far sides of housing 713 depending on the desired direction of non-solid material flow.

Figure 7D:
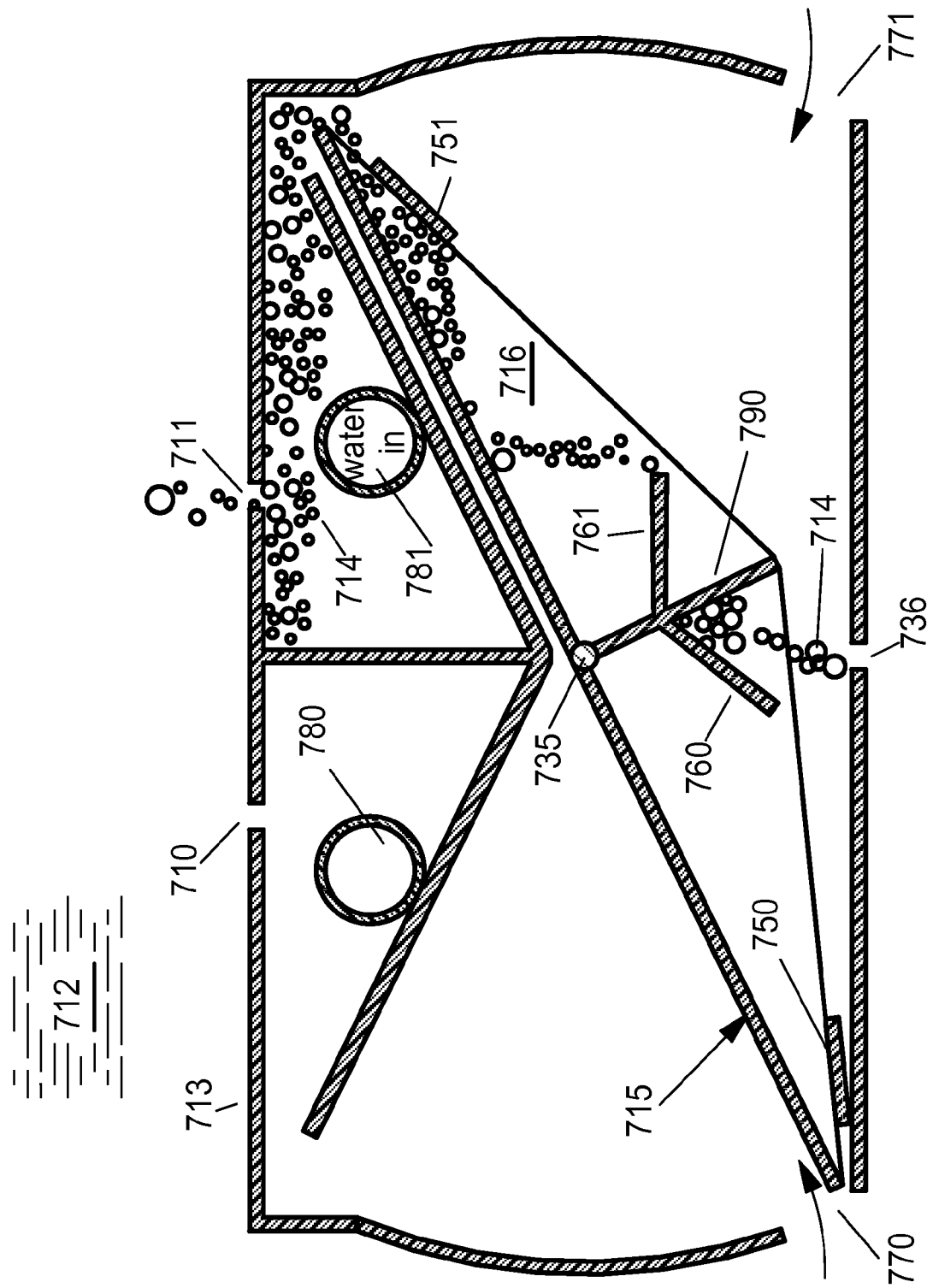

FIG. 7D shows the near completion of the transition between a first stable configuration and a second stable configuration. The buoyant material 714 is being released from the container into the upper portion of the housing 713. The upper portion of the housing acts as an accumulator to slow the release of the buoyant material 714 through right exit orifice 711 into the non-solid material 712, thereby reducing the deleterious effect of a large bubble of buoyant material 714 rapidly rising to the surface of the non-solid material 712. As the buoyant material 714 exits the housing 713 through right exit orifice 711, non-solid material enters through housing opening 781 to replace the buoyant material 714. FIG. 7D also shows the volume between the container 716 walls and the left baffle 760 and center baffle 790 beginning to fill with buoyant material 714, thereby urging the container 716 and movable surface 715 to complete its movement to its second stable state. Baffle 760 serves to contain the buoyant material 714 in the container 716 to the right of the axle of rotation 735 to provide for the application of a longer duration buoyant force since the container 716 is open on the bottom side. Note also that the configuration of right baffle 761 is such that the buoyant material is substantially released when the movable surface 715 substantially reaches its second stable state.

Figure 7E:
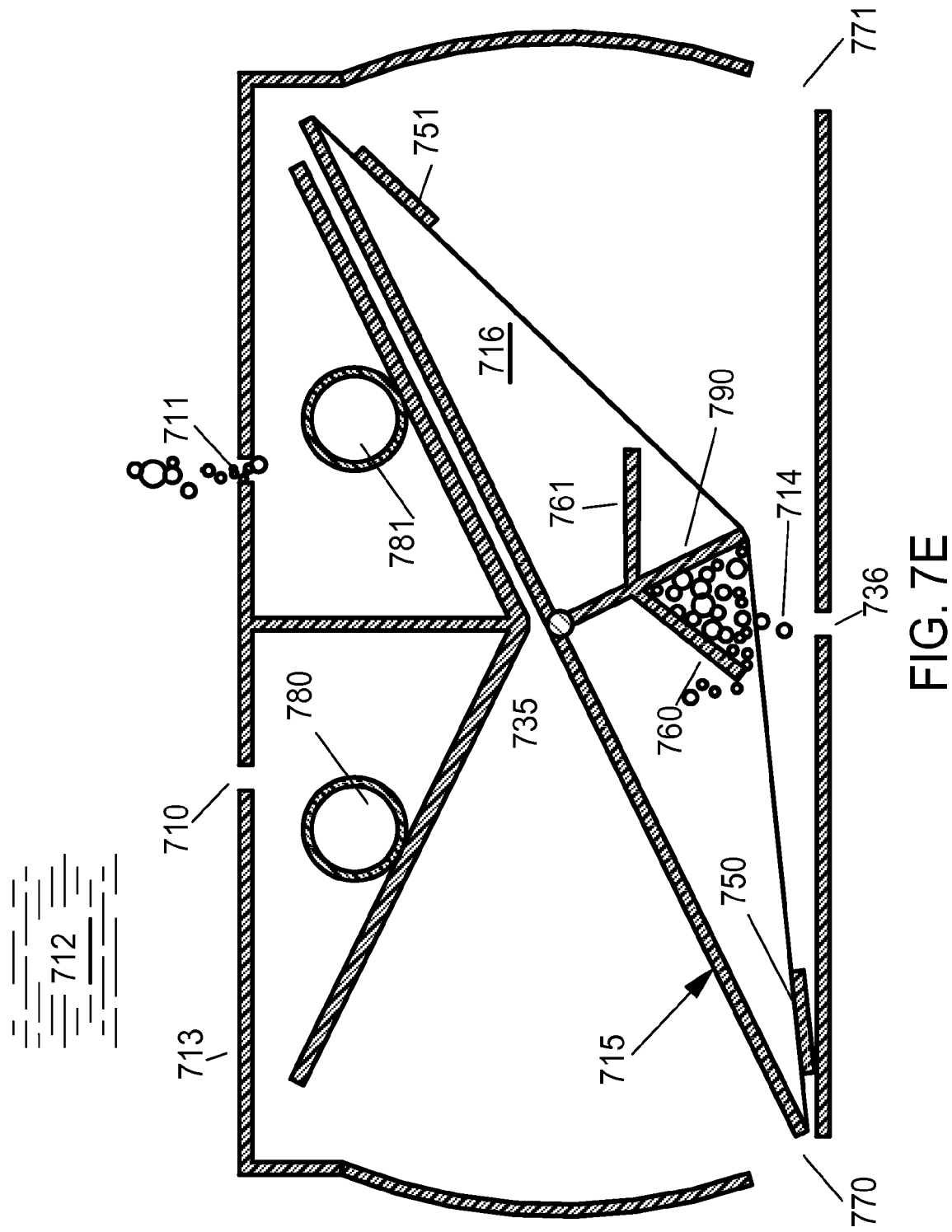

FIG. 7E shows the completion of the half cycle in which the upper portion of housing 713 acting as an accumulator to the right of the axle 735 is substantially empty of buoyant material 714 and the container 716 to the left of axle 735 is beginning to contain buoyant material 714 for the start of the second half of a complete cycle. The second half of a complete cycle behaves essentially as the mirror image of the operation shown in FIG. 7A through FIG. 7E about axle 735.

Figure 8:
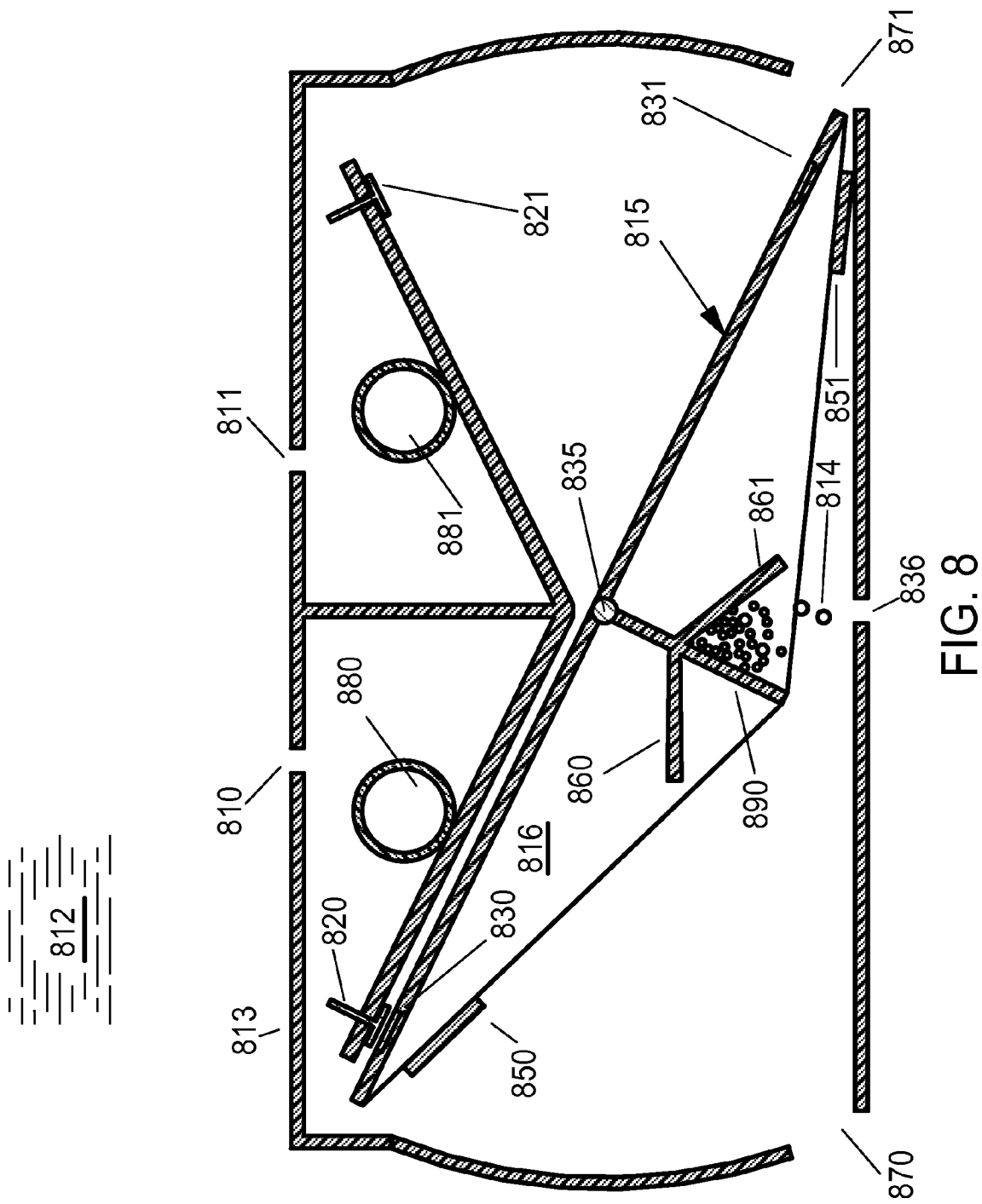
FIG. 8 is a cross sectional drawing of a non-solid material pump as in FIG. 5A through FIG. 5E with the addition of a restraining member consisting of magnets and magnetic force adjustment screws.

FIG. 8 shows a cross section drawing of an alternative pump configuration in which there is adjustable restraining member 820 and 830 and adjustable restraining member 821 and 831. In this example, restraining members are made of magnetic material 830 and screw adjustable ferromagnetic material 820 and magnetic material 831 and screw adjustable ferromagnetic material 821. The functioning of the pump is essentially as has been described in the other figures with the addition of the restraining member providing for more buoyant material 814 to be captured by container 816 before the restraining force is overcome by the buoyant force and the movable surface 815 moves. The result of the application of this restraining force is an increase in the quantity and velocity of non-solid material 812 which is moved as a result of a more complete filling of the container 816 with buoyant material 814. Restraining member component 820 and restraining member component 821 are fitted with screw or other adjustment method to allow the predetermined amount of restraining force to be adjusted so as to allow the container 816 to substantially fill with buoyant material 814 before it starts to move.

Figure 9:
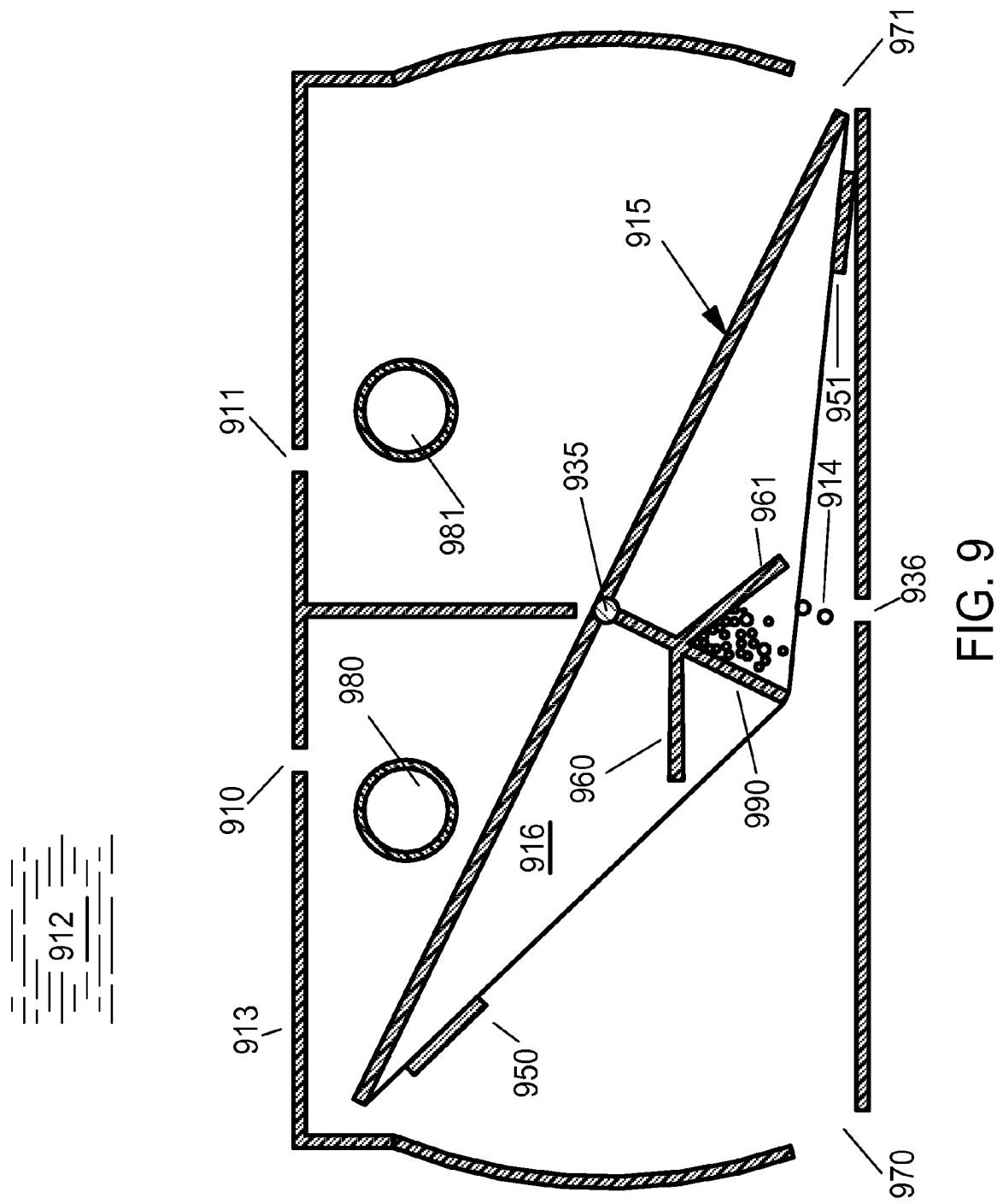
FIG. 9 is a cross sectional drawing of a non-solid material pump as in FIG. 5A through FIG. 5E with an internal baffle removed.
Figure 10:
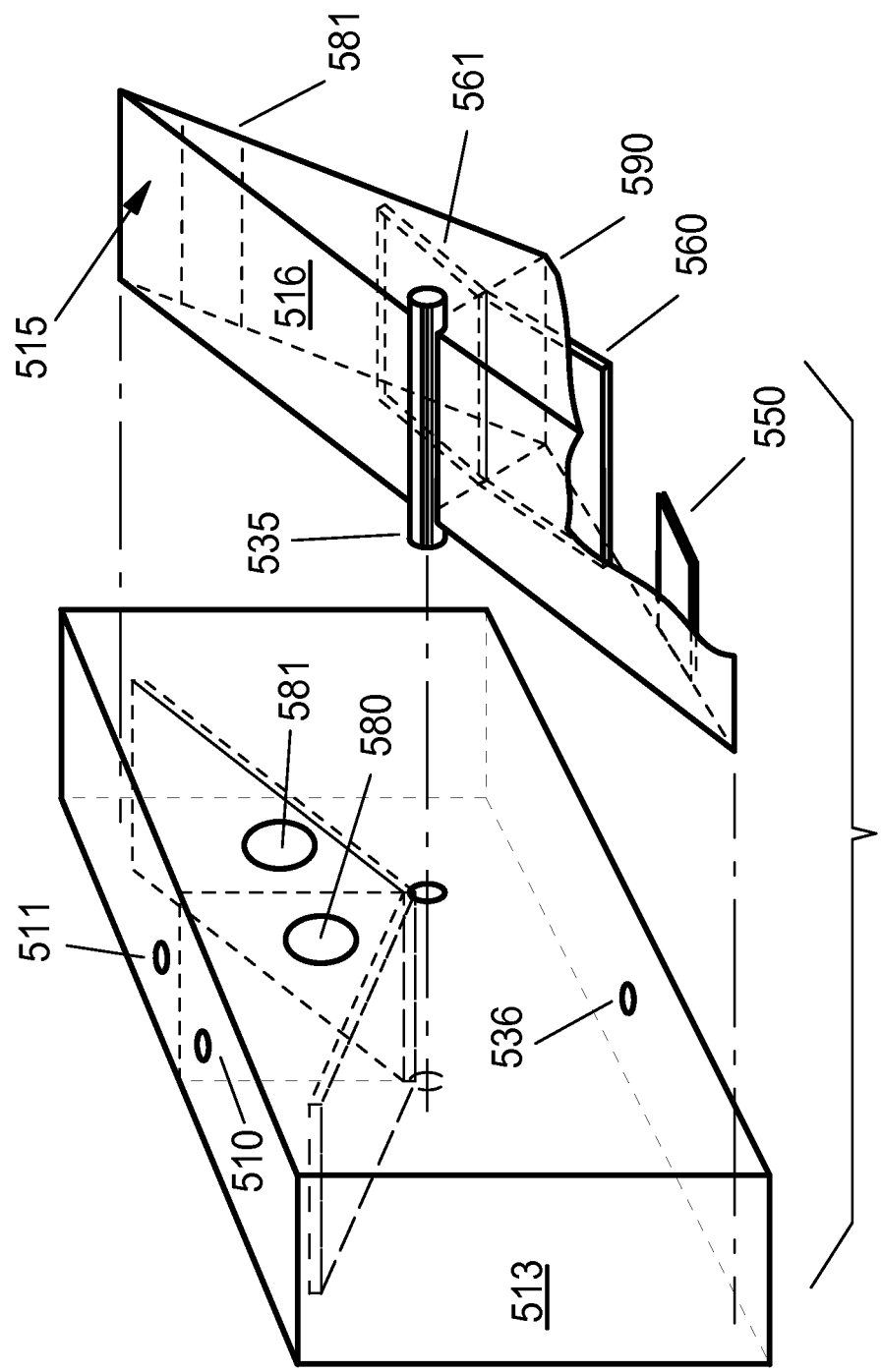
FIG. 10 is a perspective view of the embodiment as shown in FIG. 5A through FIG. 5E.

FIG. 9 is a cross sectional drawing of an alternative configuration in which two internal baffles of the housing 913 have been removed. The operation of the pump is as has been previously described.

While an embodiment has been described for producing surge in an aquarium, there is no limitation on the pumping mechanism other than that the driving material be buoyant relative to the non-solid material. In particular, variations of this apparatus may be suitable for pumping hazardous fluids or pumping in hazardous environments since the entire pump can be constructed of non-sparking, non-conductive, or non-flammable material and inert gasses may be used as the buoyant material. It can also be seen from these figures that the housing and baffles can be implemented in various configurations and combinations without affecting the basic operation of the pump. The pump is also suitable for remote, unattended operation without the need for man-made power supplies since its buoyant force can be supplied by naturally occurring biological or geophysical processes.

While the operation of the pump has been described as if it were submerged in non-solid material, it is equally capable of operating with proper connection of hoses to the various orifices of the housing which provide and receive buoyant materials and non-solid materials.

The Operation

The surge pump is self starting once it is either submerged in the non-solid fluid or the various orifices appropriately connected to the non-solid fluid reservoir. Detailed operation of the pump has been described in the previous section with reference to the figures.

I claim:

1. An apparatus for creating surge in a marine aquarium comprising:
    (a) a movable surface configured to be in contact with a movable non-solid material, wherein, said movable surface is a rotatable surface with two stable positions;
    (b) a first material orifice configured to discharge a first material said first material being buoyant relative to said movable non-solid material;
    (c) a container configured to receive said first material, wherein said container is affixed to said movable surface in a force applying configuration, and said container is comprised of a first container part and a second container part, and said first container part and said second container part are configured so as to cause said movable surface to alternately move substantially from a first stable position to a second stable position when a substantial amount of said first material is in said second container part, and said first container part and said second container part are configured so as to cause contained said first material to be alternately released when said movable surface alternately substantially reaches said first stable position and said second stable position, and said first container part and said second container part are configured on said movable surface in such a manner that said first material orifice discharges said first material alternately into said second container part and said first container part when said movable surface is alternately in its said first stable position and said second stable positions;
    (d) a housing wherein, said housing is configured to support said movable surface, and said housing is configured to confine and direct said movable non-solid material, and whereby force applied to said movable surface by said first material in said container urges said movable surface to move said movable non-solid material that is substantially in contact with said movable surface through said at least one housing opening to create a surge in said movable non-solid material external to said housing
    (e) a third container part having a third outlet orifice configured to receive said first material leaving said first container part, said third outlet orifice of size sufficiently small so as to slow the rate of release of said first material into said movable non-solid material;
    (f) a fourth container part having a fourth outlet orifice configured to receive said first material leaving said second container part, said fourth outlet orifice of size sufficiently small so as to slow the rate of release of said first material into said movable non-solid material.

2. An apparatus as in claim 1 wherein said housing is partially comprised of an aquarium surface.

3. An apparatus as in claim 1 wherein said movable non-solid material is fluid and said buoyant material is gas.

4. An apparatus for moving material comprising:
    (a) a movable surface configured to be in contact with a movable non-solid material;
    (b) a container configured to contain a sufficient amount of a buoyant material, said buoyant material being buoyant relative to said movable non-solid material, and said container being affixed to said movable surface in a force applying configuration;
    (c) a housing wherein, said housing is configured to support said movable surface, and said housing is configured to confine and direct the movement of said movable non-solid material through at least one housing opening to create a surge in said movable non-solid material external to said housing, and
    whereby force applied to said movable surface by said buoyant material in said container causes said movable surface to move said movable non-solid material that is substantially in contact with said movable surface through said at least one housing opening.

5. An apparatus as in claim 4 wherein said movable non-solid material is fluid and said buoyant material is gas.

6. An apparatus as in claim 4 further including a first material orifice, wherein said first material reacts with said movable non-solid material to produce said buoyant material, and said first material orifice is configured so as to direct said buoyant material into said container.

7. An apparatus as in claim 4 wherein:
    (a) said movable surface is configured so as to have a stable position and an unstable position, said stable position being when said container is substantially unfilled with said buoyant material and said unstable position being when said container is not in said stable position;
    (b) said container is configured so as to cause said movable surface to transition from said stable position to said unstable position when a sufficient amount of said buoyant material is captured in said container, captured said buoyant material urging said movable surface to move, and thereby urging said movable non-solid material to move;
    (c) said container is configured so as to release a sufficient amount of said buoyant material after leaving said stable position; and
    whereby said movable surface returns to said stable position and said container returns to said stable position.

8. An apparatus as in claim 7 wherein said movable surface has more than one stable position.

9. An apparatus as in claim 4 wherein said housing is partially comprised of an aquarium surface.

10. A method for moving a movable non-solid material comprising:
    (a) introducing a buoyant material into a container, said container being attached to a movable surface, said movable surface constrained to a housing;
    (b) causing said movable surface to move from a stable position to an unstable position when a sufficient amount of said buoyant material has entered said container;
    (c) releasing said buoyant material from said container urging said movable surface to return to said stable position; and whereby said movable non-solid material is moved in a direction constrained by said housing and by movements of said movable surface through at least one housing opening to create a surge in said movable non-solid material external to said housing.

11. A method as in claim 10 wherein said movable non-solid material is a fluid and said buoyant material is a gas.

12. A method as in claim 10 wherein said movable surface has more than one stable position.

\* \* \* \* \*